US007038197B2

(12) United States Patent
Bateman et al.

(10) Patent No.: US 7,038,197 B2
(45) Date of Patent: May 2, 2006

(54) MASS SPECTROMETER AND METHOD OF MASS SPECTROMETRY

(75) Inventors: Robert Harold Bateman, Knutsford (GB); Martin Green, Altrincham (GB); Michael Jackson, Warrington (GB)

(73) Assignee: Micromass Limited, Manchester (GB)

( * ) Notice: Subject to any disclaimer, the term of this patent is extended or adjusted under 35 U.S.C. 154(b) by 380 days.

(21) Appl. No.: 10/274,989

(22) Filed: Oct. 22, 2002

(65) Prior Publication Data

US 2004/0084613 A1 May 6, 2004

Related U.S. Application Data

(63) Continuation-in-part of application No. 09/823,992, filed on Apr. 3, 2001, now Pat. No. 6,878,929.

(30) Foreign Application Priority Data

May 17, 2002 (GB) .................................... 0211375
May 24, 2002 (GB) .................................... 0212021
May 29, 2002 (GB) .................................... 0212385

(51) Int. Cl.
*H01J 49/40* (2006.01)
*H01J 49/26* (2006.01)
*G01K 1/08* (2006.01)
*G01N 27/62* (2006.01)

(52) U.S. Cl. ...................... 250/281; 250/282; 250/287; 250/292; 250/396 R; 250/397

(58) Field of Classification Search ................ 250/281, 250/282, 286, 287, 290–295, 397, 299–300, 250/396 R, 423 R
See application file for complete search history.

(56) References Cited

U.S. PATENT DOCUMENTS 4,686,365 A 8/1987 Meek et al.
4,771,172 A 9/1988 Weber-Grabau et al.
5,107,109 A 4/1992 Stafford, Jr. et al.

(Continued)

FOREIGN PATENT DOCUMENTS

EP 905743 3/1999

(Continued)

OTHER PUBLICATIONS

M. Cavenago, Linac96 Conference, Aug. 26-30, 1996, "Optimization of Ion Source Extraction and Transport with Symbolic manipulation Programs: Electrostatic Lenses Formulas", http://linac96.web.cern.ch/Linac96/Proceedings/Monday/MOP29/Paper.html/.*

(Continued)

*Primary Examiner*—John R. Lee
*Assistant Examiner*—Bernard E. Souw
(74) *Attorney, Agent, or Firm*—Diederiks & Whitelaw, PLC

(57) ABSTRACT

A mass spectrometer is disclosed wherein a z-lens upstream of an orthogonal acceleration Time of Flight mass analyser is repeatedly switched between a first mode wherein ions are transmitted to the mass analyser for subsequent mass analysis with a relatively high transmission and a second mode wherein ions are transmitted with a relatively low transmission. If it is determined that mass spectral data obtained when the mass analyser is in the first mode is suffering from saturation, then suitably scaled mass spectral data obtained when the mass analyser is in the second mode is used instead. If the saturation is severe then the mass spectral data obtained in the first mode may be replaced in its entirety with mass spectral data obtained in the second mode.

83 Claims, 13 Drawing Sheets

U.S. PATENT DOCUMENTS

| | | | | |
|---|---|---|---|---|
| 5,300,774 | A * | 4/1994 | Buttrill, Jr. | 250/287 |
| 5,468,957 | A * | 11/1995 | Franzen | 250/282 |
| 5,572,022 | A * | 11/1996 | Schwartz et al. | 250/282 |
| 5,747,800 | A | 5/1998 | Yano et al. | |
| 6,080,985 | A * | 6/2000 | Welkie et al. | 250/287 |
| 6,294,790 | B1 * | 9/2001 | Weinberger | |
| 6,586,727 | B1 * | 7/2003 | Bateman et al. | |
| 6,642,514 | B1 * | 11/2003 | Bateman et al. | |
| 6,717,130 | B1 * | 4/2004 | Bateman et al. | |
| 6,747,271 | B1 | 6/2004 | Gonin et al. | |
| 6,756,587 | B1 * | 6/2004 | Bateman et al. | 250/287 |
| 6,781,117 | B1 * | 8/2004 | Willoughby et al. | |
| 6,794,641 | B1 * | 9/2004 | Bateman et al. | |
| 6,794,642 | B1 * | 9/2004 | Bateman et al. | |
| 6,812,453 | B1 * | 11/2004 | Bateman et al. | |
| 6,822,222 | B1 * | 11/2004 | Hayek et al. | |
| 6,835,928 | B1 * | 12/2004 | Bateman | |
| 6,878,929 | B1 | 4/2005 | Green et al. | |
| 2002/0063205 | A1 * | 5/2002 | Green et al. | |
| 2002/0063206 | A1 * | 5/2002 | Bateman et al. | 250/281 |
| 2004/0041091 | A1 * | 3/2004 | Bateman et al. | 250/282 |
| 2004/0084613 | A1 * | 5/2004 | Bateman et al. | |
| 2004/0188603 | A1 * | 9/2004 | Bateman et al. | |
| 2004/0232327 | A1 * | 11/2004 | Bateman et al. | 250/288 |

FOREIGN PATENT DOCUMENTS

| | | |
|---|---|---|
| EP | 1215711 | 6/2002 |
| GB | 2369721 | 6/2002 |
| GB | 2382921 | 6/2003 |
| JP | 63-279555 | 11/1988 |
| JP | 04-066862 | 3/1992 |
| JP | 2000-048764 | 4/2000 |
| JP | 2000-082439 | 5/2000 |
| JP | 2000-277050 | 10/2000 |
| WO | WO 98/50941 | 11/1998 |

OTHER PUBLICATIONS

Stoffels et al., Intl. J. Mass Spectrom. and Ion Phys., “An Ion Detecting and Measuring System with Wide Dynamic Range”, vol. 28, pp. 159-169, 1978.

Yost et al., 35th ASMS Conference on Mass Spectrometry and Allied Topics, Picogram to Microgram Analysis by Gas Chromatography/Ion Trap Mass Spectrometry, pp. 789-790, May 24-29, 1987.

* cited by examiner

| | |
|---|---|
| MEASURED MASS | 175.0605 |
| CALCULATED MASS | 175.0609 |
| mda ERROR | -0.4 |
| ppm ERROR | -2.2 |
| EMPIRICAL FORMULA | $C_8H_8NF_3$ |

MASS SPECTROMETER AND METHOD OF MASS SPECTROMETRY

CROSS-REFERENCE TO RELATED APPLICATIONS

The present application constitutes a continuation-in-part of U.S. patent application Ser. No. 09/823,992 filed Apr. 3, 2001, now U.S. Pat. No. 6,878,929.

BACKGROUND OF THE INVENTION

1. Field of the Invention

The present invention relates to a mass spectrometer and method of mass spectrometry.

2. Discussion of the Prior Art

Time of Flight mass analysers are well known wherein packets of ions are ejected by an electrode such as a pusher electrode into a field free drift region with essentially the same kinetic energy. In the drift region ions with different mass to charge ratios travel with different velocities and therefore arrive at an ion detector disposed at the exit of the drift region at different times. Measurement of the ion transit time therefore determines the mass to charge ratio of that particular ion.

One of the most commonly employed ion detectors in Time of Flight mass spectrometers is a single ion counting detector in which an ion impacting a detecting surface produces a pulse of electrons by means of, for example, an electron multiplier. The pulse of electrons is typically amplified by an amplifier and a resultant electrical signal is produced. The electrical signal produced by the amplifier is used to determine the transit time of the ion which struck the detector by means of a Time to Digital Converter ("TDC") which is started once a packet of ions is first orthogonally accelerated into the drift region. The ion detector and associated circuitry is therefore able to detect a single ion impacting onto the detector.

However, such ion detectors exhibit a certain dead-time following an ion impact during which time the detector cannot respond to another ion impact. A typical detector dead time may be of the order of 1–5 ns. If during acquisition of a mass spectrum ions arrive during the detector dead-time then they will consequently fail to be detected, and this will have a distorting effect on the resultant mass spectra. At high ion currents multiple ion arrivals cause counts to be missed resulting in mass spectral peaks with lower intensity than expected and inaccurate mass assignment.

It is known to use dead time correction software to correct for distortions in mass spectra. Statistical dead time correction can successfully correct intensity and centroid measurement to within acceptable levels up to a signal corresponding to a well defined average number of ions per pushout event i.e. a well defined average number of ions per energisation of the pusher electrode. However, software correction techniques are only able to provide a limited degree of correction. Even after the application of dead time correction techniques, ion signals resulting in more than one ion arrival on average per pushout event at a given mass to charge value will result in saturation of the ion detector and will thus result in a non-linear response and inaccurate mass determination.

This problem is particularly accentuated with gas chromatography and similar mass spectrometry applications because of the narrow chromatographic peaks which are typically presented to the mass spectrometer which may be, for example, only a few seconds wide at their base.

It is therefore desired to provide an improved mass spectrometer and method of mass spectrometry.

SUMMARY OF THE INVENTION

According to a first aspect of the present invention, there is provided a method of mass spectrometry comprising:

providing an ion source, an ion optical device downstream of the ion source, and a mass analyser downstream of the ion optical device, the mass analyser comprising an ion detector;

repeatedly switching between a first mode and a second mode either the ion source, the ion optical device or the gain of the ion detector;

obtaining first mass spectral data during the first mode and second mass spectral data during the second mode;

interrogating the first mass spectral data;

determining whether at least some of the first mass spectral data may have been affected by saturation, distortion or missed counts; and using at least some of the second mass spectral data instead of at least some of the first mass spectral data if it is determined that at least some of the first mass spectral data has been affected by saturation, distortion or missed counts.

At least an order of magnitude increase in the dynamic range over conventional apparatus is achievable with the preferred embodiment. It has been demonstrated, for example, that the dynamic range can be extended from about 3.25 orders of magnitude to about 4.65 orders of magnitude with a gas chromatography peak width of about 1.5 s at half height.

The ion source may be switched between a first mode and a second mode by either repeatedly varying the transmission of ions from the ion source or alternatively by varying the ionization efficiency of the ion source. According to this embodiment, the ion intensity which is onwardly transmitted to the ion detector can be varied by altering a characteristic of the ion source so that fewer or greater ions are generated, emitted or onwardly transmitted.

It is possible on most ion sources to change the ionization efficiency or change the transmission of ions from the ion source. For example, with Electron Impact ("EI") ion sources the transmission can be varied by varying the ion repeller voltage. The ionization efficiency can be varied by reducing the intensity of the electron beam from the filament by either altering the trap, emission or filament current or by using an electrostatic device between the filament and the source chamber. Alternatively, the electron energy can be varied or the magnetic field in proximity to the ion source can be altered thereby affecting the focusing of the electron beam from the filament.

With a Chemical Ionisation ("CI") ion source the ionization efficiency can be varied by reducing the intensity of the electron beam from the filament by altering the emission or filament current or by using an electrostatic device between the filament and the source chamber. The ionization efficiency can also be varied by reducing the pressure/flow of the CI reagent gas.

The transmission/efficiency of an Electrospray ("ESI") ion source can be varied by moving the electrospray sprayer position with respect to the sampling cone. The ionization efficiency can be varied by changing the chemical composition of the solvent flowing through the needle, for example to adjust the pH of the solvent. The ionisation efficiency can also be varied by changing the voltage applied to the electrospray needle.

With an Atmospheric Pressure Chemical Ionisation ("APCI") ion source the transmission/efficiency can be varied by moving the APCI sprayer position with respect to the sampling cone or with respect to the corona discharge needle. The ionisation efficiency of the APCI ion source can alternatively be varied by changing the amount of any dopant that may be introduced into the gaseous state.

The transmission/efficiency of an Atmospheric Pressure Photo Ionisation ("APPI") ion source can be varied by moving the APCI sprayer position with respect to the sampling cone or by changing the intensity or wavelength of the light. The efficiency of the APPI ion source can alternatively be varied by changing the amount of any dopant that may be introduced into the gaseous state.

With a Field Ionisation ("FI") ion source the ionisation efficiency can be varied by changing the potential difference between the emitter and the extraction electrode.

With a Liquid Secondary Ions Mass Spectrometry ("LSIMS") ion source or Fast Atom Bombardment ("FAB") ion source the ionisation efficiency can be varied by changing the intensity of the primary ion beam or atom beam.

With a Matrix Assisted Laser Desorption Ionisation ("MALDI") ion source or a Laser Desorption Ionisation ("LDI") ion source the intensity of each laser pulse or the number of laser pulses per unit time can be varied. Alternatively, the photon density at the target can be varied by changing the area which the laser will illuminate.

Ions emitted from the ion source may be considered to travel along an x-axis and the ion optical device preferably comprises a z-lens arranged to deflect, focus, defocus or collimate the beam of ions in a z-direction which is substantially orthogonal to the x-axis and which is also in a direction substantially normal to the plane of the mass analyser.

Alternatively, ions emitted from the ion source may be deflected, focused, defocused or collimated by a y-lens in a y-direction substantially orthogonal to the x-axis and which is also substantially parallel to the plane of the mass analyser.

However, z-focusing is preferred to other ways of altering the ion transmission efficiency since it has been found to minimise any change in resolution, mass position and spectral skew which otherwise seem to be associated with focusing/deflecting the ion beam in the y-direction.

The z-lens and/or the y-lens may comprise an Einzel lens having a front, intermediate and rear electrode, with the front and rear electrodes being maintained, in use, at substantially the same DC voltage and the intermediate electrode being maintained, in use, at a different DC voltage to the front and rear electrodes.

In one embodiment the front and rear electrodes are arranged to be maintained at between −30 to −50V DC for positive ions, and the intermediate electrode is switchable from a voltage ≦−80V DC to a voltage ≧+0V DC. In another embodiment, the front and rear electrodes are maintained at substantially the same DC voltage, e.g. for positive ions around −40V DC, and the intermediate electrode may be varied, for positive ions, from approximately −100V DC in a high sensitivity (focusing) mode anywhere up to approximately +100V DC in a low sensitivity (defocusing) mode. For example, in the low sensitivity mode a voltage of −50V DC, +0V DC, +25V DC, +50V DC or +100V DC may be applied to the central electrode.

Alternatively, the ions emitted from the ion source may be arranged to be deflected, focused, defocused or collimated in the y-direction and/or the z-direction. The ion optical device may, for example, comprise a stigmatic focusing lens having a circular aperture or a DC quadrupole lens.

In the second mode a beam of ions may be diverged to have a profile which substantially exceeds an entrance aperture to or acceptance angle of the mass analyser. When the ion optical device is in the second mode a beam of ions may be diverged to have a profile or area which substantially exceeds the profile or area of an entrance aperture to the mass analyser by at least a factor of ×2, ×4, ×10, ×25, ×50, ×75, or ×100. In a relatively high transmission (first) mode at least 80%, 85%, 90%, 95%, 96%, 97%, 98%, 99% or substantially 100% of the ions may be arranged to pass through the entrance aperture or be otherwise onwardly transmitted whereas in a relatively low transmission (second) mode less than or equal to 20%, 15%, 10%, 5%, 4%, 3%, 2%, or 1% of the ions may be arranged to pass through the entrance aperture or be otherwise onwardly transmitted. According to an embodiment in a relatively low transmission (second) mode the number of ions that pass through the entrance aperture may be arranged to be less than or equal to 20%, 15%, 10%, 5%, 4%, 3%, 2%, or 1% of the number of ions that pass through the entrance aperture in a relatively high transmission (first) mode.

In the first mode a beam of ions may be focused by the ion optical device so that they are subsequently onwardly transmitted and in the second mode a beam of ions may be defocused by the ion optical device so that only a fraction of the ions are subsequently onwardly transmitted.

In another embodiment the ion optical device may comprise an energy filtering device arranged to transmit only those ions having a kinetic energy greater than a predetermined amount.

In a yet further embodiment the gain of an ion detector comprising an Analogue to Digital Converter ("ADC") may be repeatedly switched or varied.

In the first mode the ion source or the ion optical device preferably has an ion transmission efficiency selected from the group consisting of: (i) ≧50%; (ii) ≧55%; (iii) ≧60%; (iv) ≧65%; (v) ≧70%; (vi) ≧75%; (vii) ≧80%; (viii) ≧85%; (ix) ≧90%; (x) ≧95%; or (xi) ≧98%. In the second mode the ion source or the ion optical device preferably has an ion transmission efficiency selected from the group consisting of: (i) ≦50%; (ii) ≦45%; (iii) ≦40%; (iv) ≦35%; (v) ≦30%; (vi) ≦25%; (vii) ≦20%; (viii) ≦15%; (ix) ≦10%; (x) ≦5%; or (xi) ≦2%.

The difference in sensitivity or ion transmission efficiency between the first and second modes is further preferably at least ×5, ×10, ×20, ×30, ×40, ×50, ×60, ×70, ×80, ×90 or ×100.

Preferably, substantially the same amount of time is spent in the first mode as in the second mode during acquisition of mass spectral data. In a less preferred embodiment the time spent in the first mode is different to the time spent in the second mode. The ion source and/or the ion optical device and/or the gain of the ion detector may be switched from the first mode to the second mode at least one, two, three, four, five, six, seven, eight, nine or ten times per second.

According to a less preferred embodiment either the ion source, the ion optical device or the gain of the ion detector is repeatedly switched between three or more modes.

The preferred method of sensitivity switching is particularly appropriate when the mass analyser comprises a Time to Digital Converter. A Time of Flight mass analyser, preferably an orthogonal acceleration Time of Flight mass analyser is particularly preferred. However, according to less preferred embodiments a quadrupole mass analyser, a magnetic sector mass analyser or an ion trap mass analyser may be provided.

The ion detector is preferably either: an ion counting detector; a detector including a Time to Digital Converter ("TDC"); a detector capable of recording multiple ion arrivals; a detector including an Analogue to Digital Converter ("ADC"); a detector comprising both a Time to Digital Converter ("TDC") and an Analogue to Digital Converter ("ADC"); a detector using one or more Analogue to Digital Converters ("ADC") operating at similar or dissimilar sensitivities; a detector using one or more Time to Digital Converters ("TDC") operating at similar or dissimilar sensitivities; a combination of one or more Time to Digital Converters ("TDC") and one or more Analogue to Digital Converters ("ADC"); a microchannel plate detector; a detector including a discrete dynode electron multiplier; a detector including a photomultiplier; a detector including a hybrid microchannel plate electron multiplier; or a detector including a hybrid microchannel plate photo multiplier.

The ion source may comprise a continuous ion source, for example an Electron Impact ("EI"), Chemical Ionisation ("CI") or Field Ionisation ("FI") ion source. Such ion sources may be coupled to a gas chromatography ("GC") source.

Alternatively, the ion source may comprise an Electrospray ("ESI") or Atmospheric Pressure Chemical Ionisation ("APCI") ion source. Such ion sources may be coupled to a liquid chromatography ("LC") source.

In other embodiments the ion source may be either: an Atmospheric Pressure Photo Ionisation ("APPI") ion source; an Inductively Coupled Plasma ("ICP") ion source; a Fast Atom Bombardment ("FAB") ion source; a Matrix Assisted Laser Desorption Ionisation ("MALDI") ion source; a Laser Desorption Ionisation ("LDI") ion source; a Field Desorption ("FD") ion source; or a Liquid Secondary Ions Mass Spectrometry ("LSIMS") ion source.

According to the preferred embodiment, the step of determining whether at least some of the first mass spectral data may have been affected by saturation, distortion or missed counts comprises:

providing an orthogonal acceleration Time of Flight mass analyser comprising an electrode for orthogonally accelerating ions into a drift region, the electrode being repeatedly energised; and determining if an individual mass peak in the first mass spectral data exceeds a first predetermined average number of ions per mass to charge ratio value per energisation of the electrode.

The first predetermined average number of ions per mass to charge ratio value per energisation of the electrode may be selected from the group consisting of:

(i) 1; (ii) 0.01–0.1; (iii) 0.1–0.5; (iv) 0.5–1; (v) 1–1.5; (vi) 1.5–2; (vii) 2–5; and (viii) 5–10.

Alternatively/additionally, the step of determining whether at least some of the first mass spectral data may have been affected by saturation, distortion or missed counts comprises:

providing an orthogonal acceleration Time of Flight mass analyser comprising an electrode for orthogonally accelerating ions into a drift region, the electrode being repeatedly energised; and determining if an individual mass peak in the second mass spectral data exceeds a second predetermined average number of ions per mass to charge ratio value per energisation of the electrode.

Preferably, the second predetermined average number of ions per mass to charge ratio value per energisation of the electrode is selected from the group consisting of: (i) 1/x; (ii) 0.01/x to 0.1/x; (iii) 0.1/x to 0.5/x; (iv) 0.5/x to 1/x; (v) 1/x to 1.5/x; (vi) 1.5/x to 2/x; (vii) 2/x to 5/x; and (viii) 5/x to 10/x, wherein x is the ratio of the difference in sensitivities between the first and second modes.

In a less preferred embodiment the step of determining whether at least some of the first mass spectral data may have been affected by saturation, distortion or missed counts comprises:

comparing the ratio of the intensity of mass spectral peaks observed in the first mass spectral data with the intensity of corresponding mass spectral peaks observed in the second mass spectral data; and determining whether the ratio falls outside a predetermined range.

In another less preferred embodiment the step of determining whether at least some of the first mass spectral data may have been affected by saturation, distortion or missed counts comprises:

monitoring the total ion current; and determining whether the total ion current exceeds a predetermined limit.

If it is determined that substantially all of the first mass spectral data may have been affected by saturation, distortion or missed counts then the whole of the second mass spectral data may be used instead of the first mass spectral data i.e. the second mass spectral data effectively replaces the first mass spectral data (which is substantially not used).

In order to determine whether or not to substitute the first mass spectral data entirely with the second mass spectral data it may be determined whether the Total Ion Current recorded in the first mode exceeds a predetermined limit. Alternatively, it may be determined whether the output current of an electron multiplication device exceeds a predetermined limit. In another embodiment, a single mass spectral peak or the summation of mass spectral peaks are monitored and the intensity of the single mass spectral peak or summation of mass spectral peaks determined. Saturation, distortion or missed counts may be indicated by the monitored intensity being greater than or less than a predetermined amount.

In a yet further embodiment a detection device upstream of the ion detector may be provided to monitor the ion current. The detection device may pick off or sample a portion of the primary ion beam or if an orthogonal acceleration Time of Flight mass analyser is used then the detection device may comprise an electrode positioned beyond the pushout region to monitor the axial ion beam not sampled into the time of flight drift region.

According to a second aspect of the present invention, there is provided a method of mass spectrometry, comprising:

obtaining mass spectral data at at least two different sensitivities or ion transmission efficiencies; and generating a composite mass spectrum by combining mass spectral data obtained at the at least two different sensitivities or ion transmission efficiencies.

According to a third aspect of the present invention, there is provided a method of mass spectrometry, comprising:

producing a composite mass spectrum from mass spectral data obtained at at least two different sensitivities or ion transmission efficiencies.

According to a fourth aspect of the present invention, there is provided a method of mass spectrometry, comprising:

providing a mass spectrum comprised of:

(i) first mass spectral peaks obtained in a relatively high sensitivity mode when it is determined that the first mass spectral peaks are unaffected by saturation, distortion or missed counts; and (ii) second mass spectral peaks obtained in a relatively low sensitivity mode when it is determined that corresponding first mass spectral peaks obtained in the relatively high sensitivity mode are affected by saturation, distortion or missed counts.

According to a fifth aspect of the present invention, there is provided a method of mass spectrometry comprising:

providing an ion source, a Time of Flight mass analyser comprising an ion detector or detectors, and an ion optical device intermediate the ion source and the mass analyser;

repeatedly switching the ion optical device or the ion source so as to vary the intensity of ions received by the mass analyser;

obtaining a first mass spectrum when a relatively large number of ions are received by the mass analyser;

obtaining a second mass spectrum when a relatively small number of ions are received by the mass analyser; and interrogating the first mass spectrum and replacing mass spectral data in the first mass spectrum with mass spectral data in the second mass spectrum if it is determined that at least some of the mass spectral data in the first mass spectrum is distorted due to saturation of the ion detector or detectors.

According to a sixth aspect of the present invention, there is provided a method of mass spectrometry, comprising:

providing a mass spectrum comprised of: (i) first mass spectral peaks obtained in a first mode when it is determined that the detector used to obtain the first mass spectral peaks is operating in a linear manner; and (ii) second mass spectral peaks obtained in a second mode when it is determined that the detector used to obtain corresponding first mass spectral peaks obtained in the first mode is operating in a non-linear manner.

According to an seventh aspect of the present invention, there is provided a method of mass spectrometry comprising:

providing an ion source, a Time of Flight mass analyser comprising an ion counting detector or detectors, and an ion optical device intermediate the ion source and the mass analyser;

repeatedly switching the ion optical device or the ion source so as to vary the intensity of ions received by the mass analyser;

obtaining a first mass spectrum when a relatively large number of ions are received by the mass analyser;

obtaining a second mass spectrum when a relatively small number of ions are received by the mass analyser; and interrogating the second mass spectrum and determining whether the mass spectral data in the first mass spectrum is reliable.

According to a eighth aspect of the present invention, there is provided a method of mass spectrometry, comprising the steps of:

determining a first intensity of ions having a first mass to charge ratio when an ion beam having a relatively high transmission is transmitted to an ion detector;

determining a second intensity of ions having the same first mass to charge ratio when an ion beam having a relatively low transmission is transmitted to the ion detector;

determining whether the first intensity needs to be rejected due to the ion detector being saturated when the first intensity was determined; and substituting the first intensity with another intensity related to the second intensity if it is determined that the ion detector was saturated when the first intensity was determined.

Preferably, the another intensity substantially equals the second intensity multiplied by the ratio of the high transmission to the low transmission.

According to a ninth aspect of the present invention, there is provided a method of mass spectrometry comprising the steps of:

transmitting an ion beam to an ion detector with a relatively low transmission and mass analysing the ion beam to obtain low transmission mass spectral data;

transmitting an ion beam to the ion detector with a relatively high transmission and mass analysing the ion beam to obtain high transmission mass spectral data; and providing a mass spectrum based upon the high transmission mass spectral data unless it is determined that the ion detector was saturated with ions when the high transmission mass spectral data was obtained in which case some or all of the high transmission mass spectral data is replaced with data related to the low transmission mass spectral data.

According to a tenth aspect of the present invention, there is provided a method of mass spectrometry comprising:

repeatedly switching the gain of an ion detector;

obtaining first mass spectral data when the ion detector has a first relatively high gain;

obtaining second mass spectral data when the ion detector has a second relatively low gain;

determining whether at least some of the first mass spectral data is suffering from saturation, distortion or missed counts; and replacing at least some of the first mass spectral data with second mass spectral if it is determined that at least some of the first mass spectral data is suffering from saturation, distortion or missed counts.

According to an eleventh aspect of the present invention, there is provided a mass spectrometer comprising:

an ion source;

an ion optical device downstream of the ion source;

a mass analyser downstream of the ion optical device, the mass analyser comprising an ion detector; and a control system arranged to repeatedly switch between a first mode and a second mode either the ion source, the ion optical device or the gain of the ion detector;

wherein the mass analyser obtains, in use, first mass spectral data during the first mode and second mass spectral data during the second mode; and wherein the control system further:

(a) interrogates the first mass spectral data;

(b) determines whether at least some of the first mass spectral data may have been affected by saturation, distortion or missed counts; and (c) uses at least some of the second mass spectral data instead of at least some of the first mass spectral data if it is determined that at least some of the first mass spectral data has been affected by saturation, distortion or missed counts.

The control means is preferably arranged to switch the ion optical device (preferably a z-lens) and/or less preferably the ion source back and forth between a relatively high and a relatively low ion transmission mode. Two data streams are therefore obtained.

The high transmission data is interrogated to see whether the ion detector may have been saturated or providing a non-linear response when some or all of the high transmission data was obtained. If it is determined that some of the high transmission data is corrupted due to saturation effects, then it is either rejected in its entirety or alternatively individual data peaks are replaced with data obtained from the low transmission data and appropriately scaled.

According to further less preferred embodiments, the ion optical system or the ion source may be arranged and adapted to be operated in at least three different sensitivity modes. For example four, five, six etc. up to practically an indefinite number of sensitivity modes may be provided.

According to a twelfth aspect of the present invention, there is provided a mass spectrometer, comprising:

an ion source;

an ion optical device;

a Time of Flight mass analyser comprising an ion detector or detectors;

control means arranged to repeatedly switch the ion optical device or the ion source so as to vary the intensity of ions received by the mass analyser wherein a first mass spectrum when a relatively large number of ions are received by the mass analyser is obtained, in use, and a second mass spectrum when a relatively small number of ions are received by the mass analyser is obtained in use; and processor means which interrogates the first mass spectrum and replaces mass spectral data in the first mass spectrum with mass spectral data in the second mass spectrum if it is determined that at least some of the mass spectral data in the first mass spectrum is distorted due to saturation or distortion of the ion detector or detectors.

According to a thirteenth aspect of the present invention there is provided a mass spectrometer, comprising:

an ion detector comprising an Analogue to Digital Converter;

control means arranged to repeatedly switch the gain of the Analogue to Digital Converter between a relatively high gain and a relatively low gain so that first mass spectral data is obtained when the Analogue to Digital Converter has the relatively high gain and second mass spectral data is obtained when the Analogue to Digital Converter has the relatively low gain; and processor means which interrogates the first mass spectral data and uses at least some second mass spectral data instead of at least some first mass spectral data if it is determined that at least some of the first mass spectral data is distorted, saturated, or suffering from missed counts.

BRIEF DESCRIPTION OF THE DRAWINGS

Various embodiments of the present invention will now be described, by way of example only, and with reference to the accompanying drawings in which:

FIG. 3(*b*) depicts another side view of the preferred mass spectrometer of FIG. 3(*a*);

FIG. 4(*b*) illustrates how a composite mass spectrum may be obtained according to a preferred embodiment at high sensitivity;

FIG. 4(*c*) illustrates how a composite mass spectrum may be obtained according to a preferred embodiment at low sensitivity;

FIG. 4(*d*) further illustrates how the composite mass spectrum may be obtained according to the preferred embodiment;

FIG. 6(*b*) shows data obtained for the same sample without using sensitivity switching, and the inset shows in greater detail the two Total Ion Current chromatograms in a region where the ion detector was suffering from saturation;

FIG. 7(*b*) illustrates how the chromatographic integrity and relative intensity is improved when sensitivity switching is employed;

FIG. 9(*b*) illustrates corresponding higher mass errors which are obtained when the preferred method of sensitivity switching is not used;

DETAILED DESCRIPTION OF THE PREFERRED EMBODIMENTS

Figure 1:
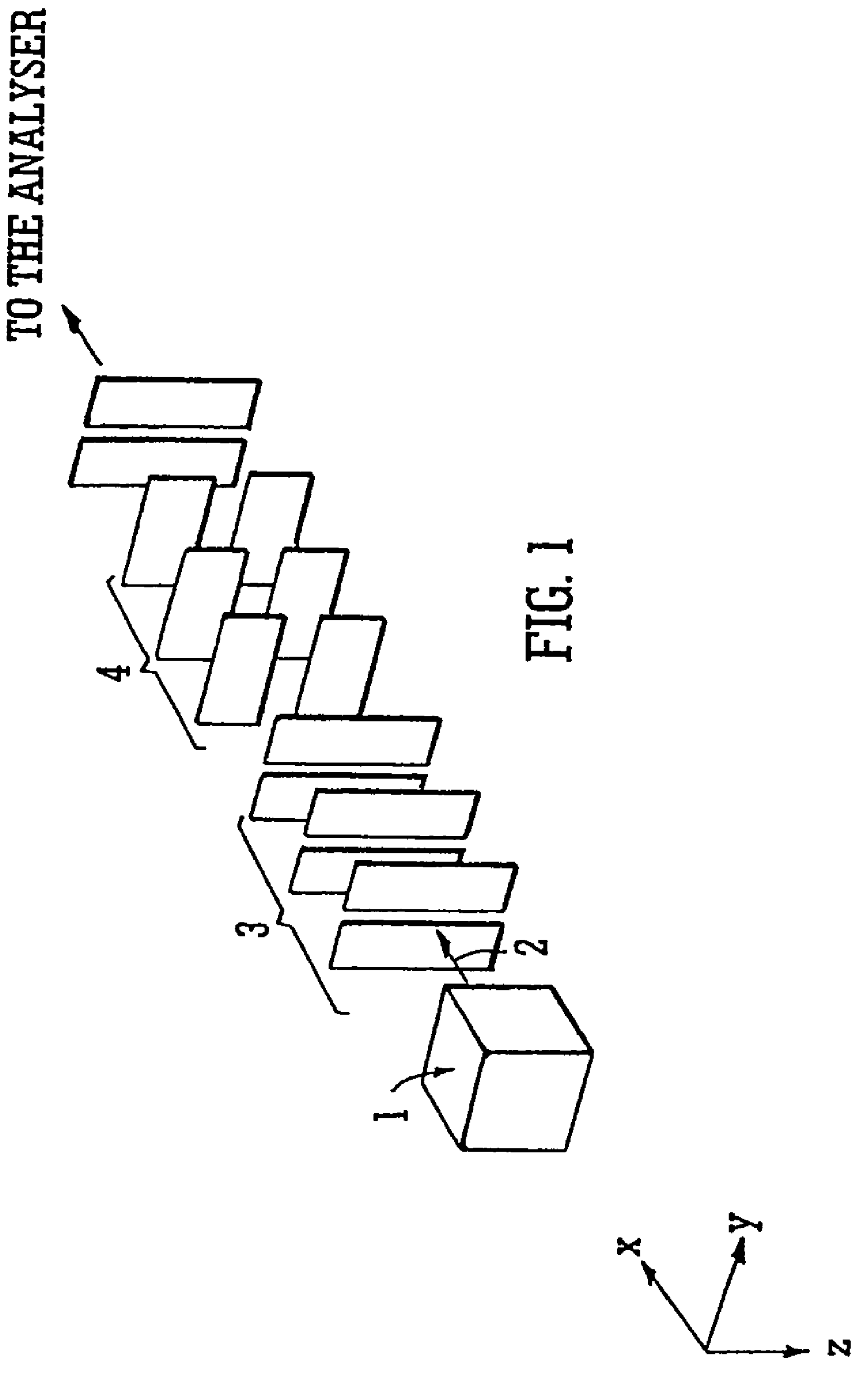
FIG. 1 shows a preferred ion optical arrangement upstream of a mass analyser.

Various embodiments of the present invention will now be described. FIG. 1 shows an ion source 1, preferably an Electron Impact or Chemical Ionisation ion source. An ion beam 2 emitted from the ion source 1 travels along an axis referred to hereinafter as the x-axis. The ions in the beam 2 may be focused/collimated in a y-direction orthogonal to the x-axis by a y-lens 3. A z-lens 4 is preferably provided downstream of the y-lens 3. The z-lens 4 may be arranged to deflect or focus the ions in the z-direction which is perpendicular to both the y-direction and to the x-axis. The z-direction is also orthogonal to the plane of a subsequent mass analyser 9 (see FIGS. 2 and 3).

The z-lens 4 may comprise a number of electrodes, and according to a preferred embodiment comprises an Einzel lens wherein the front and rear electrodes are maintained in use at substantially the same fixed DC voltage, and the DC voltage applied to an intermediate electrode may be varied to alter the degree of focusing/defocusing of an ion beam 2 passing therethrough. An Einzel lens may also be used for the y-lens 3. In less preferred arrangements, just a z-lens 4 or a y-lens 3 (but not both) may be provided.

Figure 2:
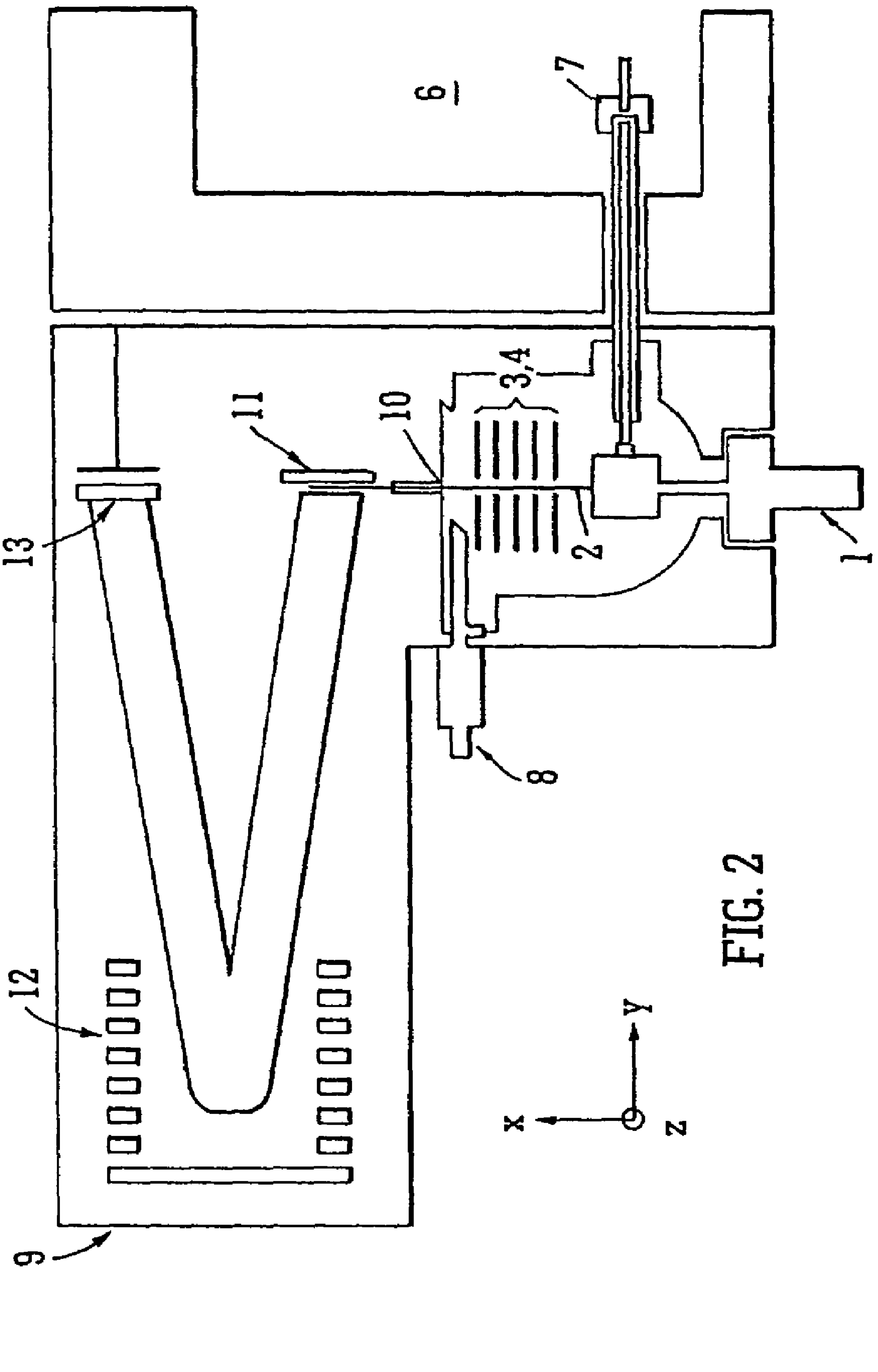
FIG. 2 shows a plan view of a preferred mass spectrometer coupled to a gas chromatography source.

FIG. 2 shows a plan view of a mass spectrometer according to a preferred embodiment. The mass spectrometer is preferably a Gas Chromatogram orthogonal acceleration Time of flight ("GCT") mass spectrometer which allows fast acquisition of full spectra with high sensitivity and elevated resolution (7000 FWHM). A removable ion source 1 is shown together with a gas chromatography interface or re-entrant tube 7 which communicates with a gas chromatography oven 6. A reference gas inlet is typically present but is not shown. Exact mass measurements can be made using a single point lock mass common to both a high and a low sensitivity range.

A beam of ions 2 emitted by the ion source 1 passes through lens stack and collimating plates 3,4 which preferably comprises a y-lens 3 and a switchable z-lens 4. The z-lens 4 is arranged in a field free region of the ion optics and is connected to a fast switching power supply capable of supplying from −100 to +100V DC. With positive ions, −100V DC will focus an ion beam 2 passing therethrough and a more positive voltage, e.g. up to +100V DC, will substantially defocus a beam of ions 2 passing therethrough and will thereby reduce the intensity of the ions subsequently entering the mass analyser 9. The z-lens power supply preferably switches between two voltages so as to repetitively switch the z-lens 4 between high and low sensitivity modes of operation.

Downstream of ion optics 3,4 is an automatic pneumatic isolation valve 8. The beam of ions 2 having passed through ion optics 3,4 then passes through an entrance slit or aperture 10 into an orthogonal acceleration Time of Flight mass analyser 9. Packets of ions are preferably injected or orthogonally accelerated into the drift region of the orthogonal acceleration Time of Flight mass analyser 9 by pusher electrode 11. Packets of ions may be reflected by reflectron 12. The ions contained in a packet become temporally separated in the drift region and are then detected by an ion detector 13 which preferably incorporates a Time to Digital Converter in its associated circuitry.

The precise and stable relationship between ion arrival time and the square root of its mass allows good measurement accuracy with only a single internal reference mass.

According to the preferred embodiment the z-lens 4 is repeatedly switched between a high transmission mode and a low transmission mode wherein an ion beam passing therethrough is repeatedly focused in the z-direction (which is normal to the plane of the Time of Flight mass spectrometer 9) and then defocused in the z-direction. The z-lens 4 can preferably be switched between high and low transmission modes in <5 ms.

Figure 3A:
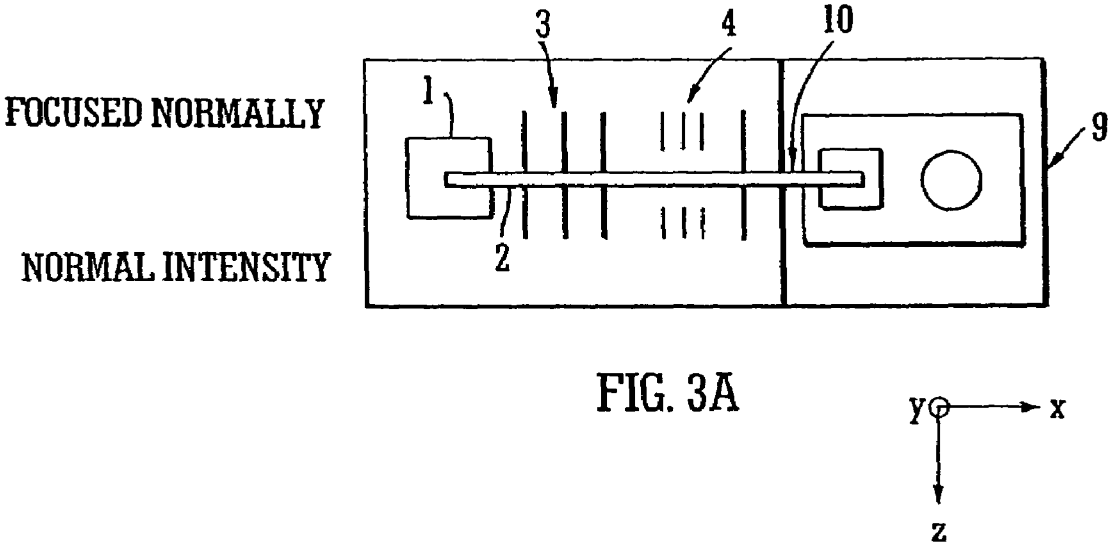
FIG. 3(*a*) shows a side view of a preferred mass spectrometer.
Figure 3B:
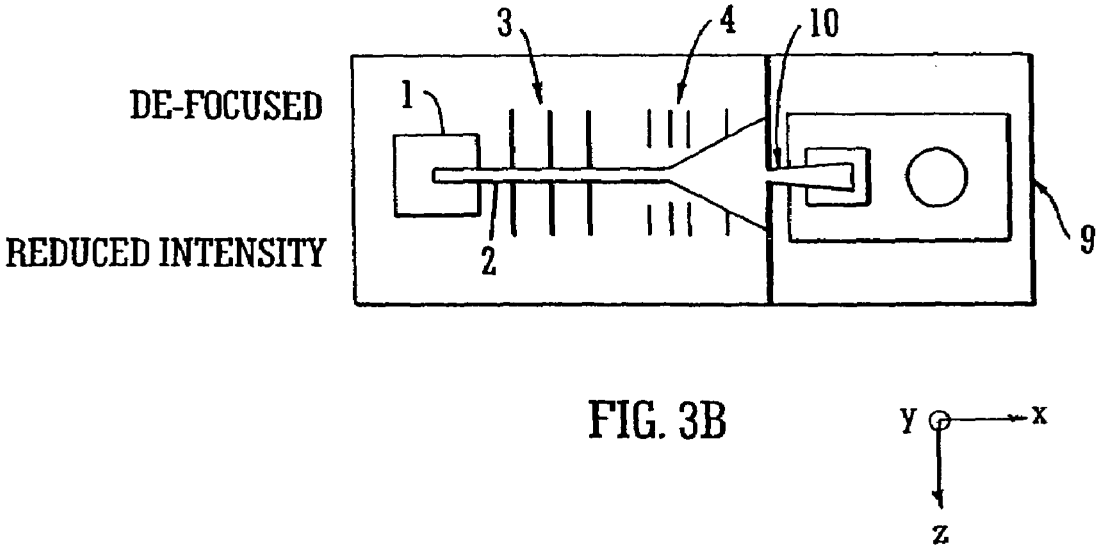
Figure 4B:
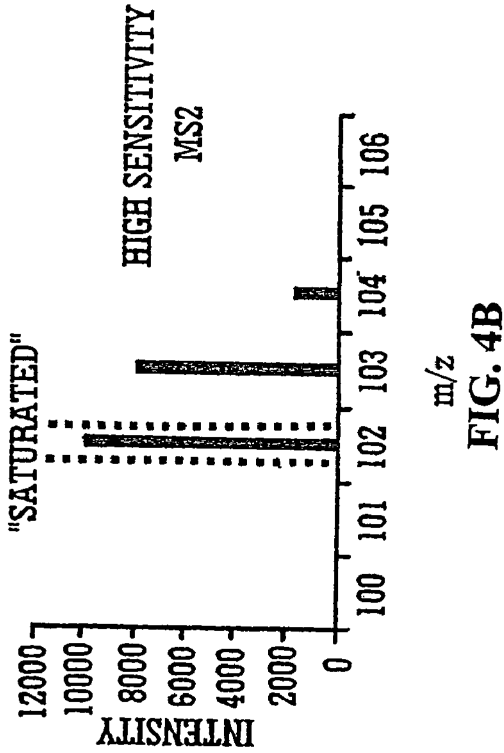
FIG. 4(*a*) illustrates how a composite mass spectrum may be obtained according to a preferred embodiment at low sensitivity.
Figure 4D:
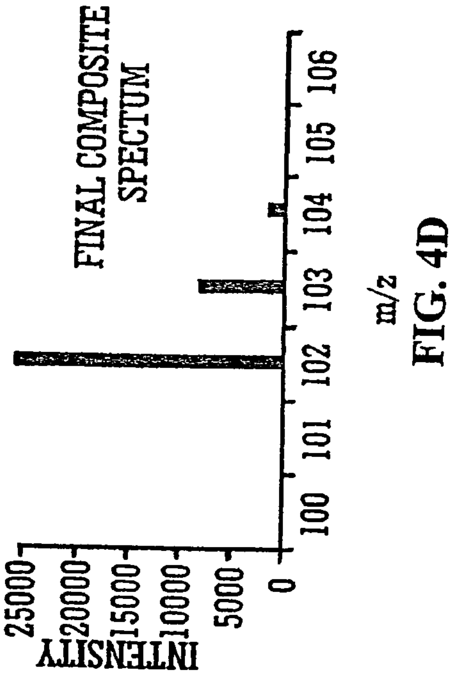
Figure 4A:
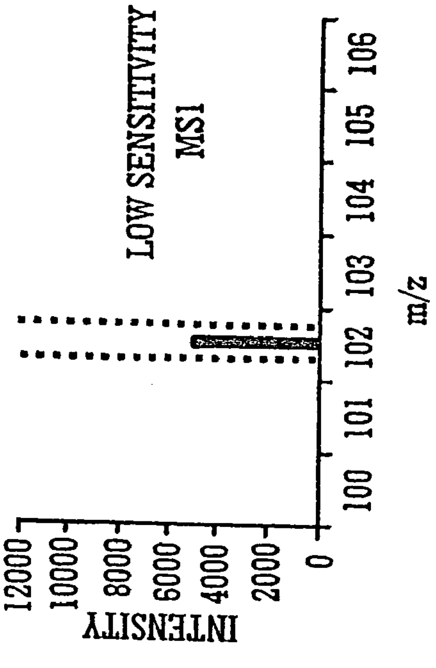
Figure 4C:
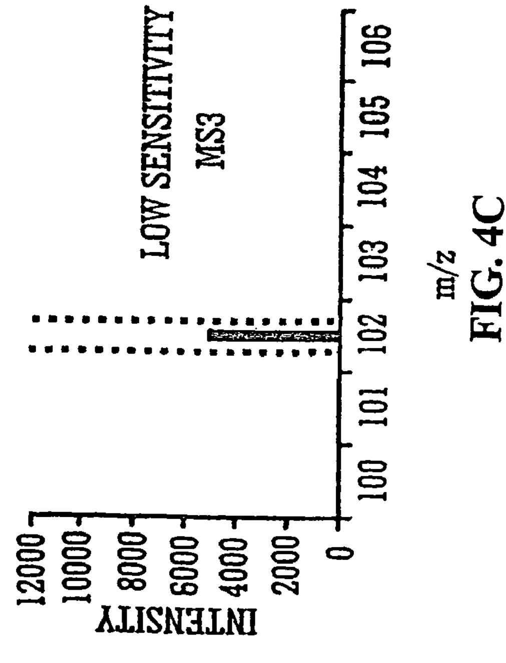

FIGS. 3(*a*) and (*b*) show side views of the mass spectrometer shown in FIG. 2. In FIG. 3(*a*) the beam of ions 2 emitted from an ion source 1 is shown passing through the y-lens 3. The z-lens 4 is shown here operating in a high sensitivity mode and focuses or otherwise ensures that the ion beam 2 falls substantially within the acceptance area and acceptance angle of an entrance slit 10 of the mass analyser 9 so that a substantial proportion of the ions subsequently enter the analyser 9 which is positioned downstream of the entrance slit 10.

FIG. 3(*b*) shows the z-lens 4 being operated in a low sensitivity mode wherein the z-lens 4 defocuses or otherwise deflects the beam of ions 2 so that the beam of ions 2 has a much larger diameter or area than that of the entrance slit 10 to the mass analyser 9. Accordingly, a much smaller proportion of the ions will subsequently enter the mass analyser 9 in this mode of operation compared with the mode of operation shown in FIG. 3(*a*) since a large percentage of the ions will fall outside of the acceptance area and acceptance angle of the entrance slit 10. The intensity of the ions transmitted to the mass analyser 9 is therefore repeatedly varied between a high intensity and a low intensity.

According to a preferred embodiment, the transmission of the axial ion beam may be switched, for example, between 100% and 2% (i.e. 1/50th full transmission) on a scan to scan basis and mass spectral data is obtained in both modes of operation. Independent mass calibrations, single point internal lock mass correction and dead time correction may be applied to both high and low transmission spectra in real time at 10 spectra per second. At least some of the high transmission spectra are interrogated during the acquisition and any mass peaks which suggest that the ion detector was suffering from saturation, distortion or missed counts are flagged.

Important aspects of the preferred embodiment will now be described in more detail in relation to FIG. 4. FIG. 4(*a–c*) illustrates three consecutive mass spectra MS1, MS2 and MS3 obtained within a fraction of a second of each other. MS1 and MS3 were obtained in a low sensitivity mode. In this case for sake of illustration purposes only the transmission in the low sensitivity mode was only 1/5th that in the high transmission mode whereas according to the preferred embodiment the difference in sensitivities is about an order of magnitude greater i.e. ×50. MS2 was obtained in a high sensitivity mode. The intensity of ions having a mass to charge ratio of 102 in MS2 is determined to be 10,000 units and a determination was made that the ion detector was affected by saturation, distortion or missed count when this measurement was made.

A mass window centered on the saturated peak having a mass to charge ratio of 102 is then mapped onto the same mass region in the low transmission mass spectra MS1 and MS3 obtained immediately before (MS1) and immediately following (MS3) the high transmission/sensitivity mass spectrum MS2. The low transmission signal in these two windows is then averaged and this signal, appropriately multiplied by the sensitivity scaling factor (×5), is then substituted for the saturated signal in the high transmission spectra MS2. A final composite mass spectrum is therefore obtained using both high transmission and low transmission data as shown in FIG. 4(*d*).

According to the preferred embodiment therefore, at least some data from the high transmission (sensitivity) mass spectrum MS2 is rejected and substituted for data from the low transmission (sensitivity) data sets MS1,MS3 if it is determined that significant ion counts have been lost in the high transmission data set. In further embodiments substantially the whole of the high transmission (sensitivity) data may be rejected in favour of low transmission (sensitivity) data.

There are a number of approaches for determining whether or not high transmission mass spectral data is saturated, distorted or otherwise suffering from missed counts. Firstly, when using a preferred orthogonal acceleration Time of Flight mass analyser, saturation may be considered to have occurred if an individual mass peak in the high transmission data exceeds a predetermined average number of ions per mass to charge ratio value per pushout event (i.e. per mass to charge ratio value per energisation of the pusher electrode 11). If it does then the high transmission data may be rejected and low transmission data, scaled appropriately, may be used in its place.

An alternative approach is to decide if an individual mass spectral peak in the low transmission data exceeds a predetermined average number of ions per pushout event. This is because if the ion detector 13 is heavily saturated in the high transmission mode then the recorded ion intensity may, in such circumstances, decline and begin to approach zero. In such circumstances, low transmission data, scaled appropriately will be used instead of the saturated high transmission mass spectral data.

Over and above the mechanism described above which affects individual mass spectral peaks, counts may be lost from the entire data set due to exceeding the number of recorded events per second which can be transferred from the memory of a Time to Digital Converter across the internal transfer bus. Once this limit is exceeded internal memory within the Time to Digital Converter electronics overflows and data is lost. Counts may also be lost from the entire data set due to the electron multiplication device used in the detection system experiencing a loss of gain once a certain output current is exceeded. Once this output is exceeded the gain will drop. The data set produced will now be incomplete and its integrity compromised.

At the point at which either of these two situations occurs for the high transmission data, the entire high transmission spectra may, in one embodiment, be rejected and substituted in its entirety by low transmission data suitably scaled.

Criteria which may be used to determine whether the high transmission data should be rejected in its entirety include determining whether the Total Ion Current ("TIC") recorded in the high transmission mode exceeds a predetermined transfer bus number of events per second limit. The high transmission data may also be rejected if it is determined that the output current of an electron multiplication device in the high transmission mode exceeds a predetermined value. The output current may be determined from the Total Ion Current recorded in the high transmission mode and the measured gain of the detection system prior to acquisition.

The intensity of a single mass spectral peak or the summation of mass spectral peaks which are present at constant levels in the ion source may also be monitored and used to determine whether the high transmission data should be rejected. The monitored mass spectral peak(s) may be residual background ions or a reference compound introduced via a separate inlet at a constant rate. If the intensity of the reference mass spectral peak(s) falls below a certain percentage of its initial value in the high transmission spectrum the entire high transmission spectrum may be rejected and substituted by low transmission data suitably scaled. The acceptable value of intensity within the high transmission data set can be a fixed predetermined value or can be a moving average of intensity monitored during acquisition. In the latter case short-term variations in intensity will result in rejection of high transmission data but longer-term drift in intensity of the internal check peaks will not cause rejection of high transmission data.

As an alternative to interrogating single ion intensities or Total Ion Current in mass spectra as criteria for rejecting the high transmission data, a separate detection device may be installed to monitor the ion current or some known fraction of the ion current, independently of the mass spectrometer's detection system. When this recorded value exceeds a predetermined limit the entire high transmission spectrum may be rejected and substituted in its entirety for low transmission data suitably scaled. In one embodiment this detection device may take the form of an electrode, between the source and the analyser, partially exposed to the primary ion beam on which an induced electric current, proportional to the ion current in this region, may be monitored. In another embodiment, specifically relating to an orthogonal acceleration Time of Flight mass spectrometer, a detector may be positioned behind the pushout region to collect the portion of the axial ion beam not sampled into the time of flight drift region. In each case the measured ion current may be used to determine the Total Ion Current at the detector when each mass spectrum was recorded, and used as a criteria for determining situations when ion counts will be lost from the high transmission data.

Using data from low transmission mass spectra obtained immediately before and immediately after a high transmission mass spectrum improves the statistics of measurement of intensity and centroid by using as much data as possible and gives a better estimate of the intensity which would have appeared in the high transmission data at that time if saturation, distortion or missed counts had not occurred. For GC mass spectrometry the signal intensity rapidly changes as a sample elutes giving rise to chromatographic peaks. The intensity of the two low transmission mass spectra bracketing the high transmission mass spectrum may be significantly different. An average of these will give a more accurate representation of the probable intensity of a mass spectral peak or peaks at the time that the high transmission data was recorded.

However, it is not essential that two low transmission mass spectra are averaged. Dynamic range will still be increased if only one of the mass spectra from the low transmission data set is used for substitution. All the above criteria for stitching data are still valid. The further away in time that the low transmission mass spectrum used for substitution is from the high transmission mass spectrum exhibiting saturation the less accurate will be the estimation of the intensity of the substituted ions.

According to one embodiment, each low and high transmission mass spectrum may be acquired in 95 ms with a delay between mass spectra of 5 ms to allow the preferred z-lens 4 to switch mode. Since every other mass spectrum is actually presented, five mass spectra per second are displayed.

Figure 5:
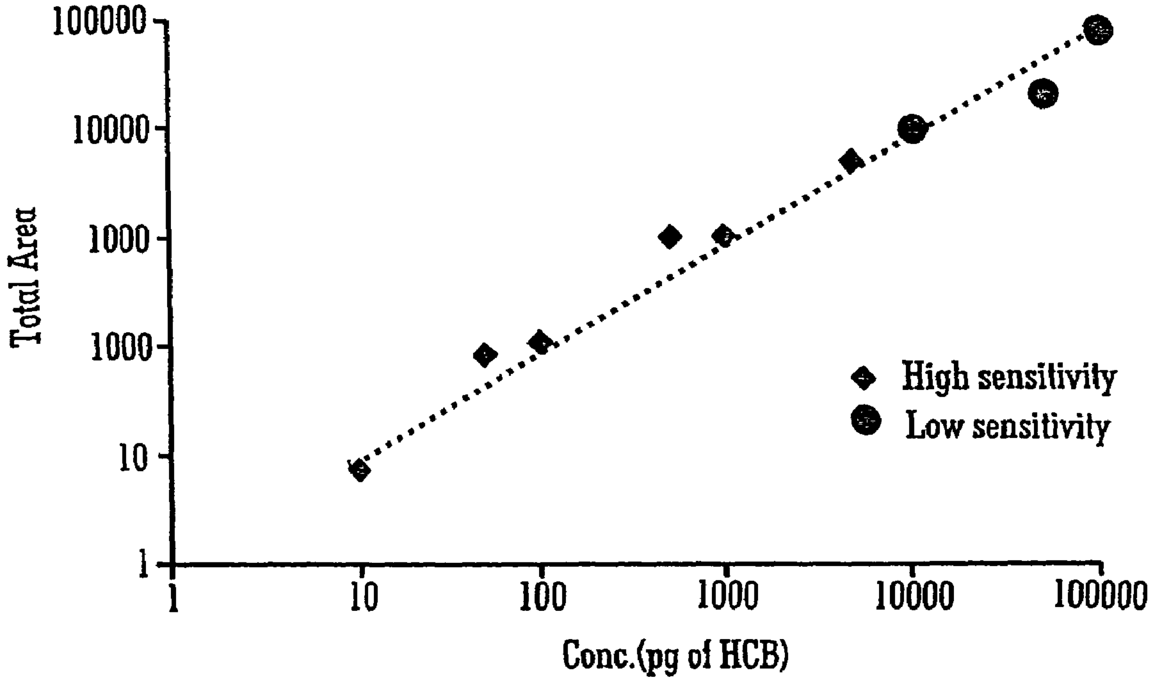
FIG. 5 shows experimental data illustrating how the dynamic range of the ion detector may be extended by combining mass spectral data obtained at two different sensitivities.

FIG. 5 shows experimental data illustrating that the dynamic range has been extended in one embodiment from about 3.25 orders of magnitude to at least 4.0 orders of magnitude (for a GC peak width of 1.5 s at half height) using a combination of data from both the high and low sensitivity data sets. In this particular case, the system was tuned to give a ratio of approximately 80:1 between the high and low sensitivity data sets. The experiment allowed equal acquisition time for both data sets by alternating between the two sensitivity ranges between mass spectra.

Standard solutions of HCB (Hexachlorobenzene) ranging in concentration from 10 pg to 100 ng were injected via the gas chromatography source. The peak area response (equivalent to the ion count) for the reconstructed ion chromatogram of mass to charge ratio 283.8102 is shown plotted against the concentration. The results from the low sensitivity data set were multiplied by ×80 before plotting to normalise them to the high sensitivity data set.

In the following examples data was obtained using a standard GC Column (DB5-MS 15M×0.25 mm ID×0.25μ) and ionisation was achieved by EI+ GC-MS. For reference, DB5 indicates the specific type of phase coating on the inside of the column and MS indicates that a low bleed column for mass spectrometry applications was used. The column has a 0.25 mm inside diameter and the phase coating is 0.25 μm thick. A sensitivity scaling factor of ×50 was used i.e. the ion transmission in the low sensitivity mode was 1/50th that in the high sensitivity mode.

A complex mixture of fragrance compounds was mass analysed by exact mass gas chromatography with and without sensitivity switching. For this type of complex mixture analysis components can be present over a very wide range of concentrations. It is important that dynamic range is maximised without compromise to ultimate detection limits and that chromatographic integrity is retained allowing deconvolution of overlapping chromatographic peaks.

The complex fragrance mixture used split injection with a split ratio of 10:1 and the GC oven was started at 60° C. which was held for two minutes and then ramped to 250° C. at a rate of 10° C./minute with five mass spectra per second being acquired.

The fragrance mixture was introduced into the gas chromatograph in solution by syringe. The gas chromatograph has a inert glass heated injection region with a volume of approximately 1–2 ml to allow for expansion of solvent. A flow of helium was set up through the injector, during the injection, so that approximately 90% of the helium, delivered to the injector, is released through a split port in the injection region so that only approximately 10% of the total flow reaches the head of the GC column. This split flow carries a proportion of the solvent and sample with it resulting in a reduction in the sample loading onto the column of approximately 90%. Since the injection volume is swept very quickly using this method the band of sample on the head of the column is very narrow leading to sharper chromatographic peaks. Split injection was used to adjust the amount of sample introduced into the mass spectrometer to demonstrate the dynamic range enhancement as an alternative to diluting the sample.

Figures 6A, 6B:
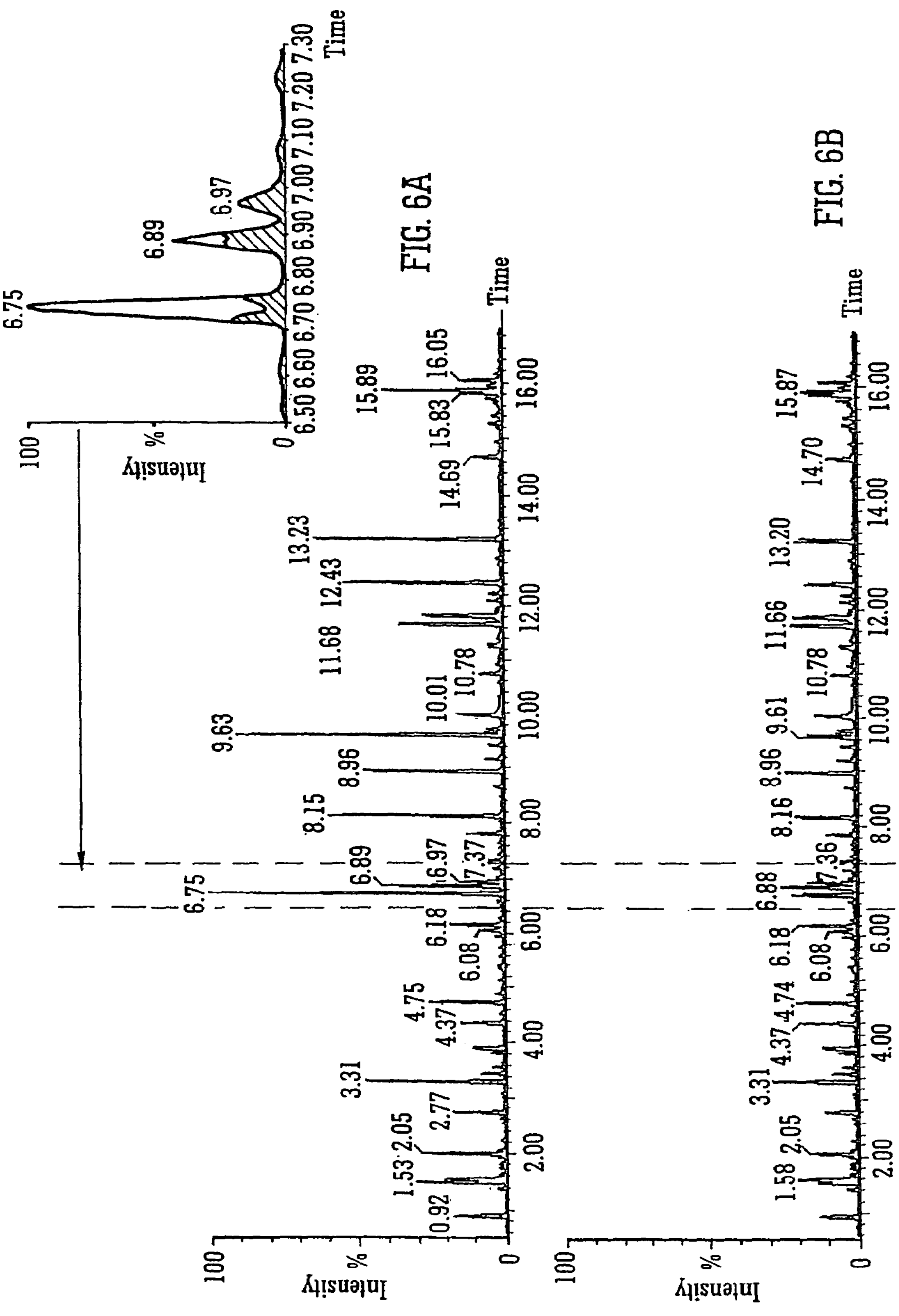
FIG. 6(*a*) shows a Total Ion Current chromatogram for a complex fragrance mixture obtained using the preferred method of sensitivity switching.

FIG. 6(*a*) shows a Total Ion Current chromatogram of the complex fragrance mixture obtained using sensitivity switching to increase the dynamic range. FIG. 6(*b*) shows the results of analysing the same sample under identical conditions but without using the preferred method of sensitivity switching. The inset shows a region of the Total Ion Current chromatogram where the Time to Digital Converter of the ion detector in the orthogonal acceleration Time of Flight mass analyser was experiencing saturation. As can be seen, the preferred embodiment provides a significant improvement in dynamic range as saturation effects can be minimized.

Figure 7B:
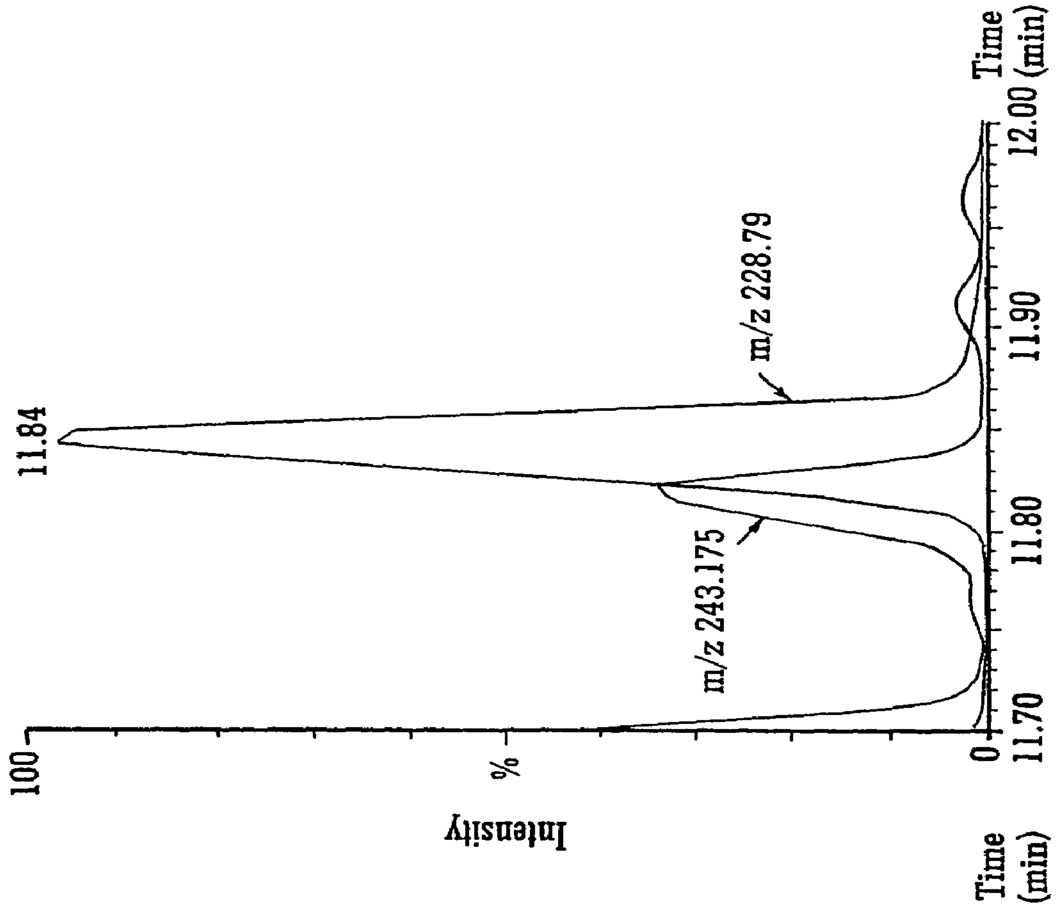
FIG. 7(*a*) shows reconstructed mass chromatograms of two co-eluting components obtained without using sensitivity switching.
Figure 7A:
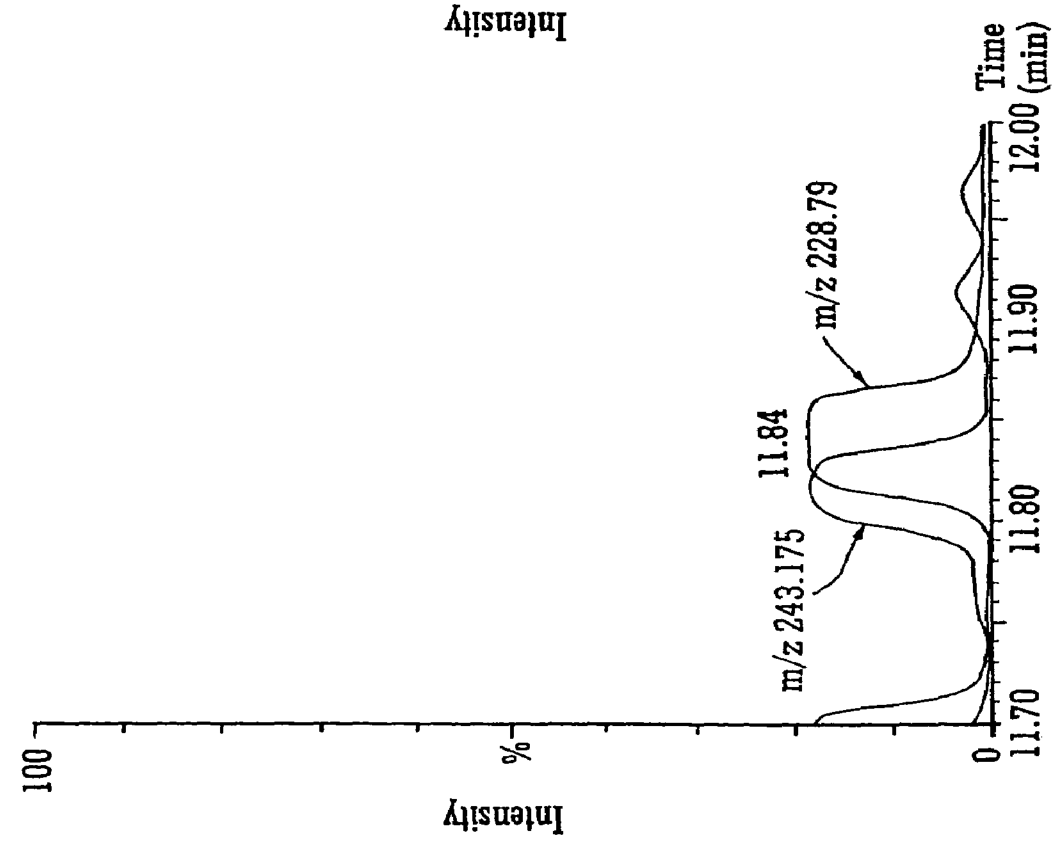

FIG. 7(*a*) show a portion of the reconstructed GC-MS mass chromatograms for two ions co-eluting from the complex fragrance mixture (for which the Total Ion Current chromatogram is shown in FIG. 6) with a retention time of 11.84 min. One ion has a mass to charge ratio of 243.175 and the other co-eluting ion has a mass to charge ratio of 228.79. The data shown in this Figure was obtained without sensitivity switching. FIG. 7(*b*) shows corresponding reconstructed mass chromatograms obtained using the preferred method of sensitivity switching. These Figures illustrate the improvement in chromatographic integrity and relative intensity which is achievable using the preferred method of sensitivity switching. The data was obtained when high transmission data exhibited saturation.

Figure 8:
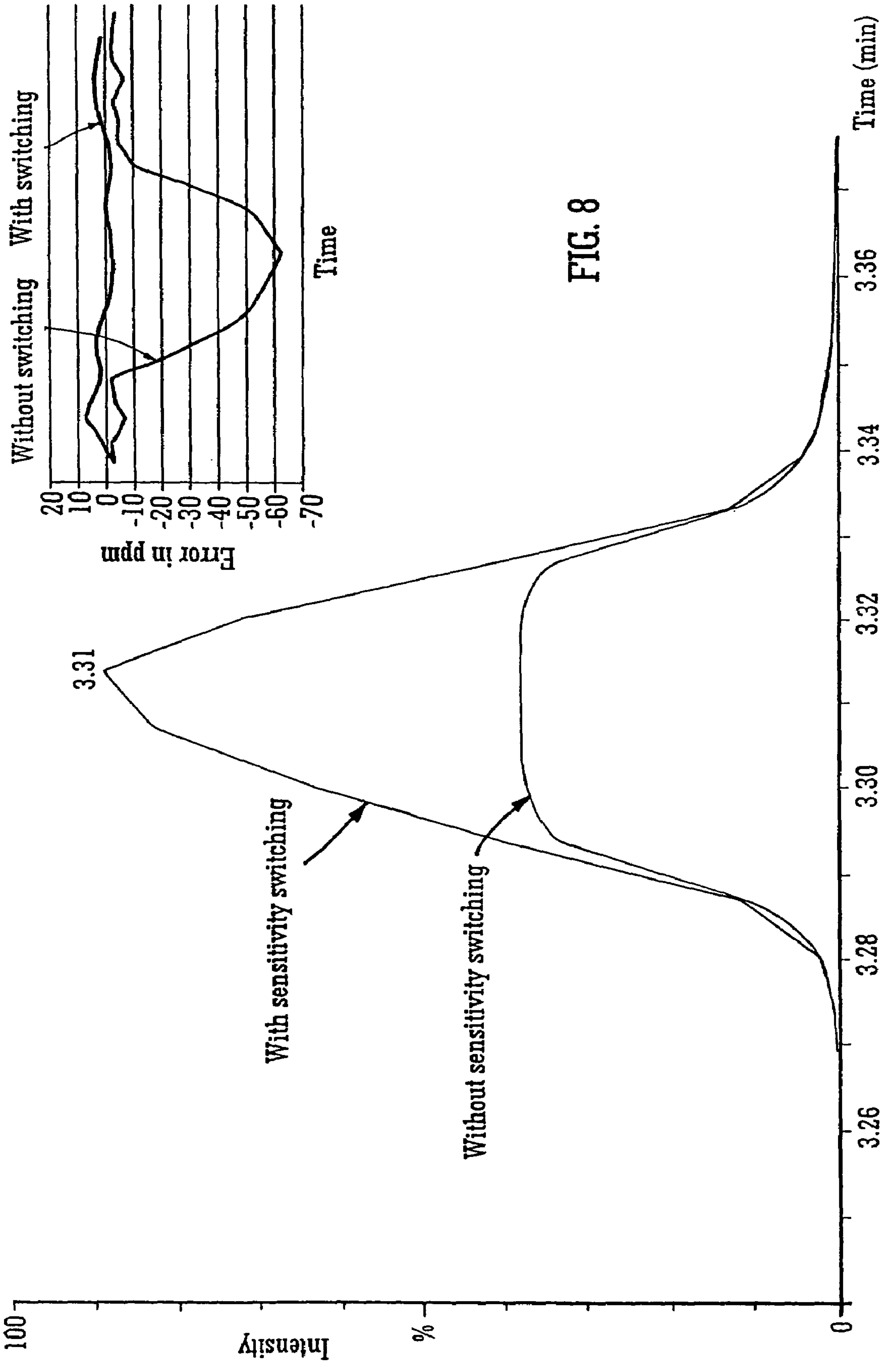
FIG. 8 shows the reconstructed mass chromatogram of a molecular ion with and without sensitivity switching, and the inset shows the ppm error in mass measurement of the molecular ion as the analyte elutes.

FIG. 8 shows the reconstructed mass chromatogram of a molecular ion $C_{10}H_{18}O$ present in the fragrance mixture having a mass to charge ratio of 154.1358 and a retention time of 3.31 min with and without using the preferred method of sensitivity switching. The inset shows the ppm error in mass measurement of the molecular ion as the analyte elutes. For the data obtained without using sensitivity switching the mass error reaches a maximum of −63 ppm due to dead time saturation effects. This is compared to an RMS error of only 3.2 ppm for the data where sensitivity switching was employed according to the preferred embodiment.

Figure 9A:
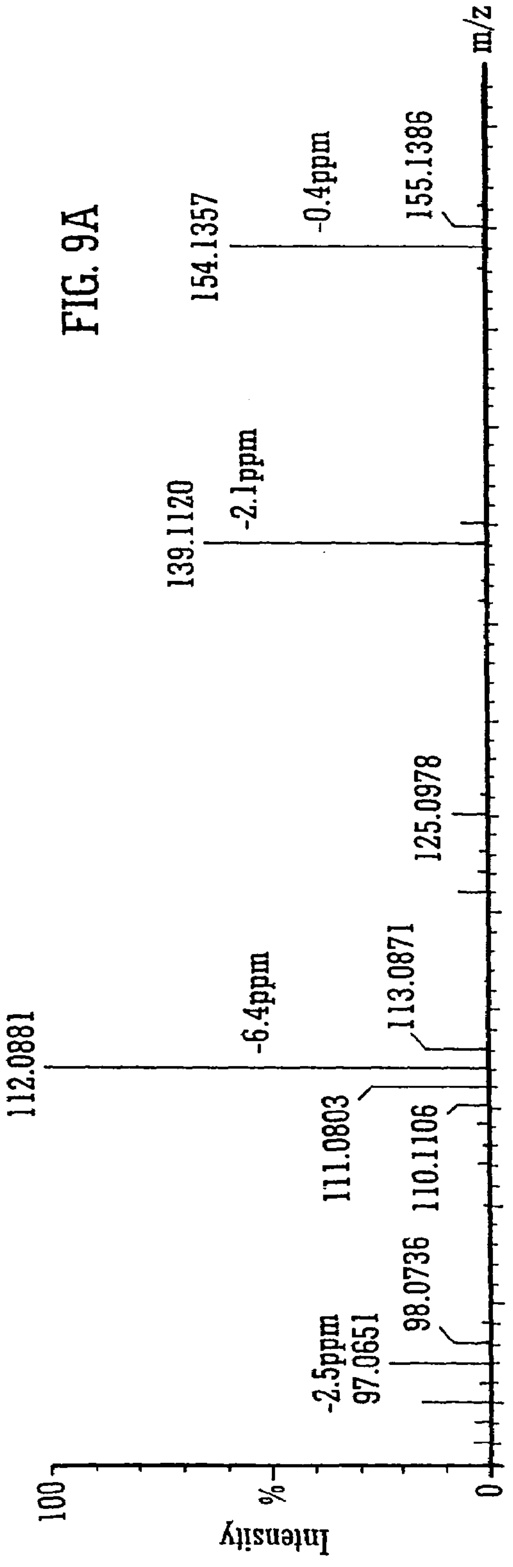
FIG. 9(*a*) illustrates the ppm error in mass measurement with the preferred sensitivity switching approach.
Figure 9B:
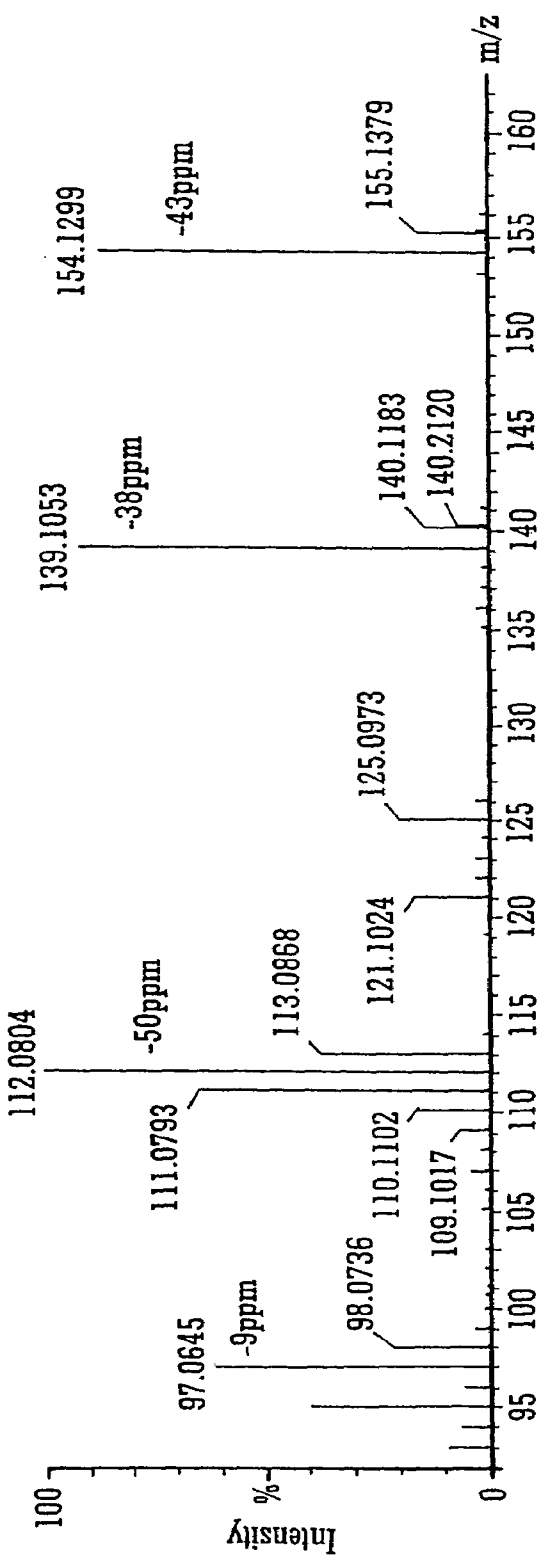

FIG. 9(*a*) shows a corresponding mass spectrum obtained from the chromatographic peak having a retention time of 3.31 min with sensitivity switching and is annotated with the mass measurement error in ppm for the molecular ion $C_{10}H_{18}O$ having a mass to charge ratio of 154.1358. The mass spectrum also shows mass measurement accuracy for fragment ions resulting from fragmentation in the Electron Impact ("EI") ion source. FIG. 9(*b*) shows a corresponding mass spectrum obtained without sensitivity switching. As can be seen, the preferred method of correcting for otherwise distorted data enables the mass to charge ratio of the molecular ion (and also the fragment ions) to be accurately determined. This data illustrates the distortion in peak ratios and mass assignment caused by the Time to Digital Converter suffering from saturation which is corrected using the sensitivity switching technique.

In the pharmaceutical industry it is essential that the identity and purity of starting materials for synthesis is known. This can be achieved using exact mass GC-MS. As the concentration and response of these synthetics (monomers) is not always accurately known it is important to be able to analyse these compounds with wide dynamic range to obtain semi quantitative information about the level of any impurities and exact mass confirmation of the presence of the target molecule.

Figure 10:
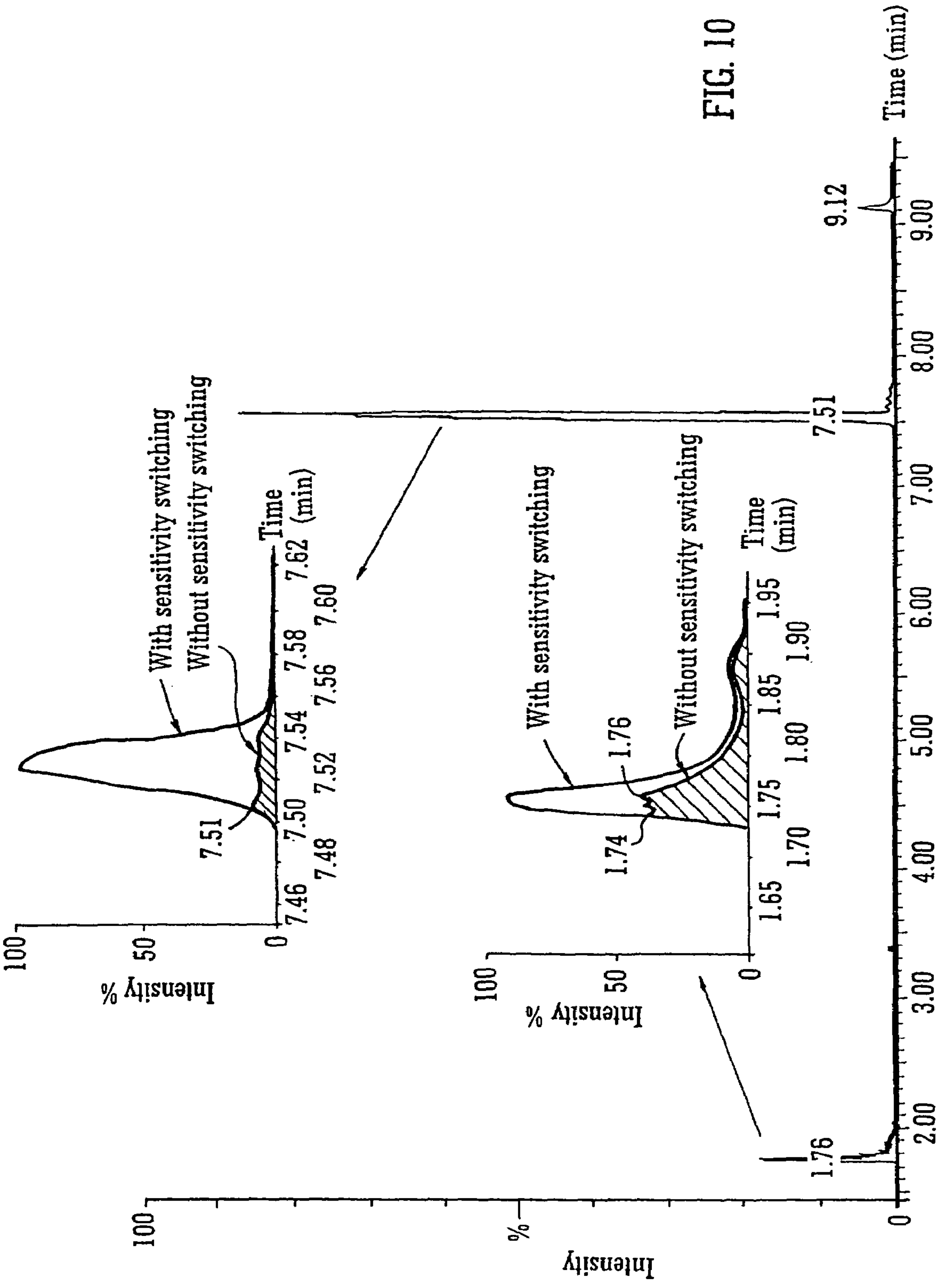
FIG. 10 show Total Ion Current chromatograms of a combinatorial monomer demonstrating approximately a tenfold increase in dynamic range when using sensitivity switching according to the preferred embodiment.
Figure 11:
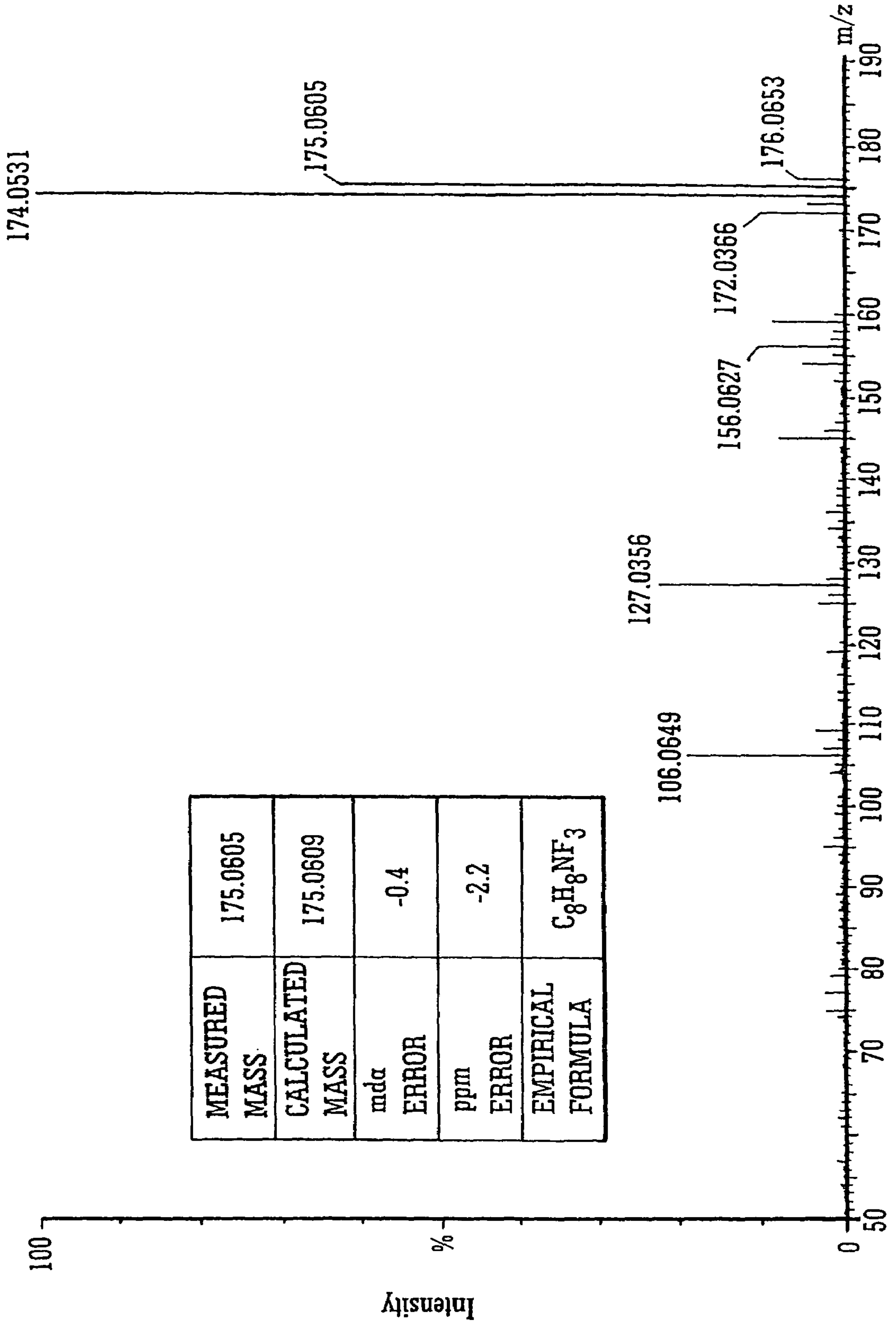
FIG. 11 shows an accurate mass spectrum obtained according to the preferred embodiment of a target monomer.
Figure 12:
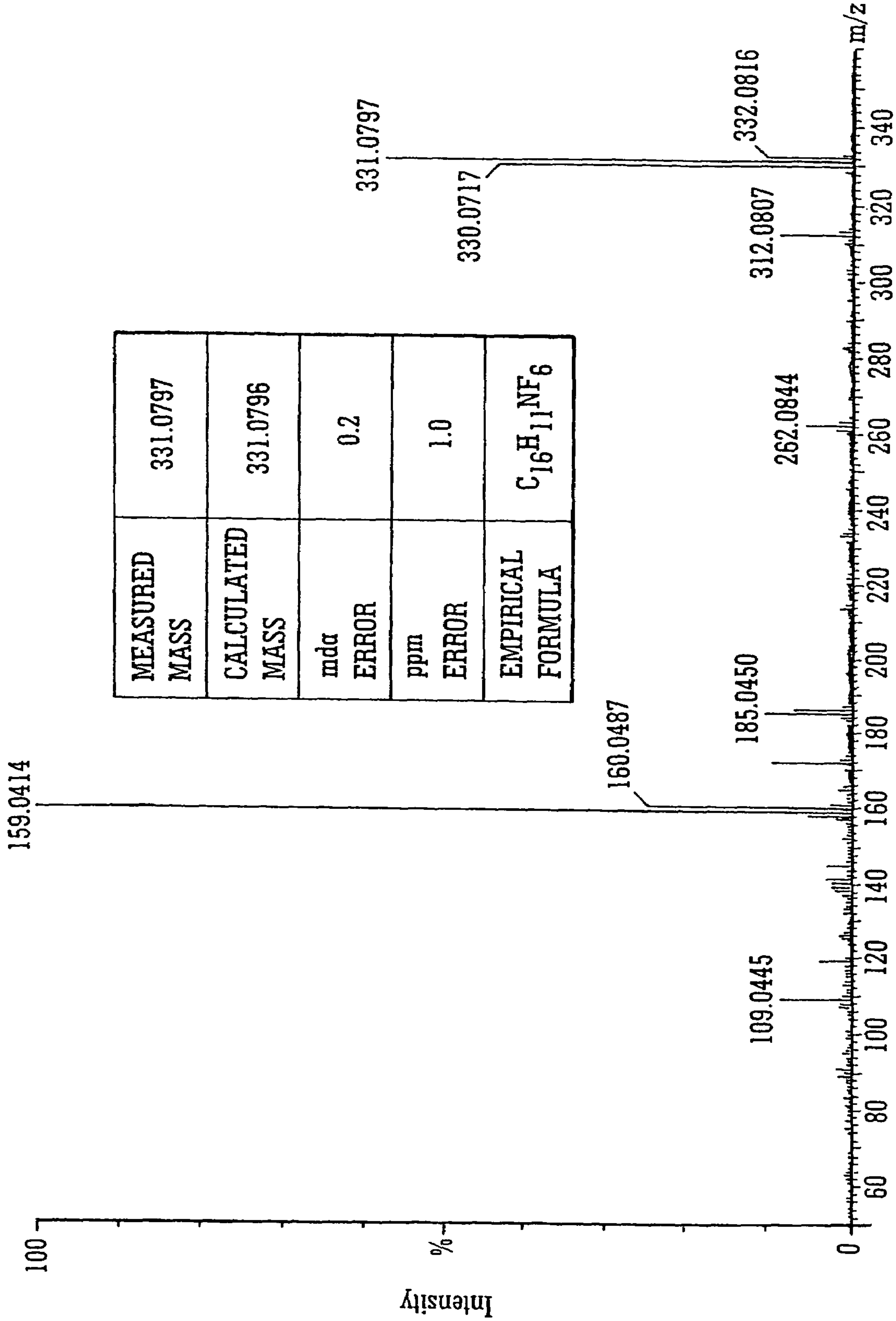
FIG. 12 shows an accurate mass spectrum obtained according to the preferred embodiment of a major impurity.

The following example demonstrates the power of the preferred sensitivity switching technique to produce exact mass measurements and to retain semi quantitative information from a combinatorial library monomer at high concentration. FIG. 10 shows the EI-GC-MS Total Ion Current chromatogram for the analysis of the combinatorial monomer with and without sensitivity switching. The peak obtained at 1.76 min was identified as the target compound and the peak obtained at 7.51 min was identified as a significant impurity. For analysis of the target compound the injection was split 10:1 and the GC oven was started at 60° C. which was held for two minutes and then ramped to 250° C. at a rate of 15° C./minute with five mass spectra being acquired per second. The mass spectrum of the target compound eluting at 1.76 min is shown in FIG. 11 and the mass spectrum of the impurity eluting at 7.51 min is shown in FIG. 12. Also shown in these Figures is the error between measured and calculated mass and the empirical formula of the target compound and the impurity. These results show that the dynamic range of the GCT has been increased approximately ten-fold using the preferred sensitivity switching method.

Figure 13:
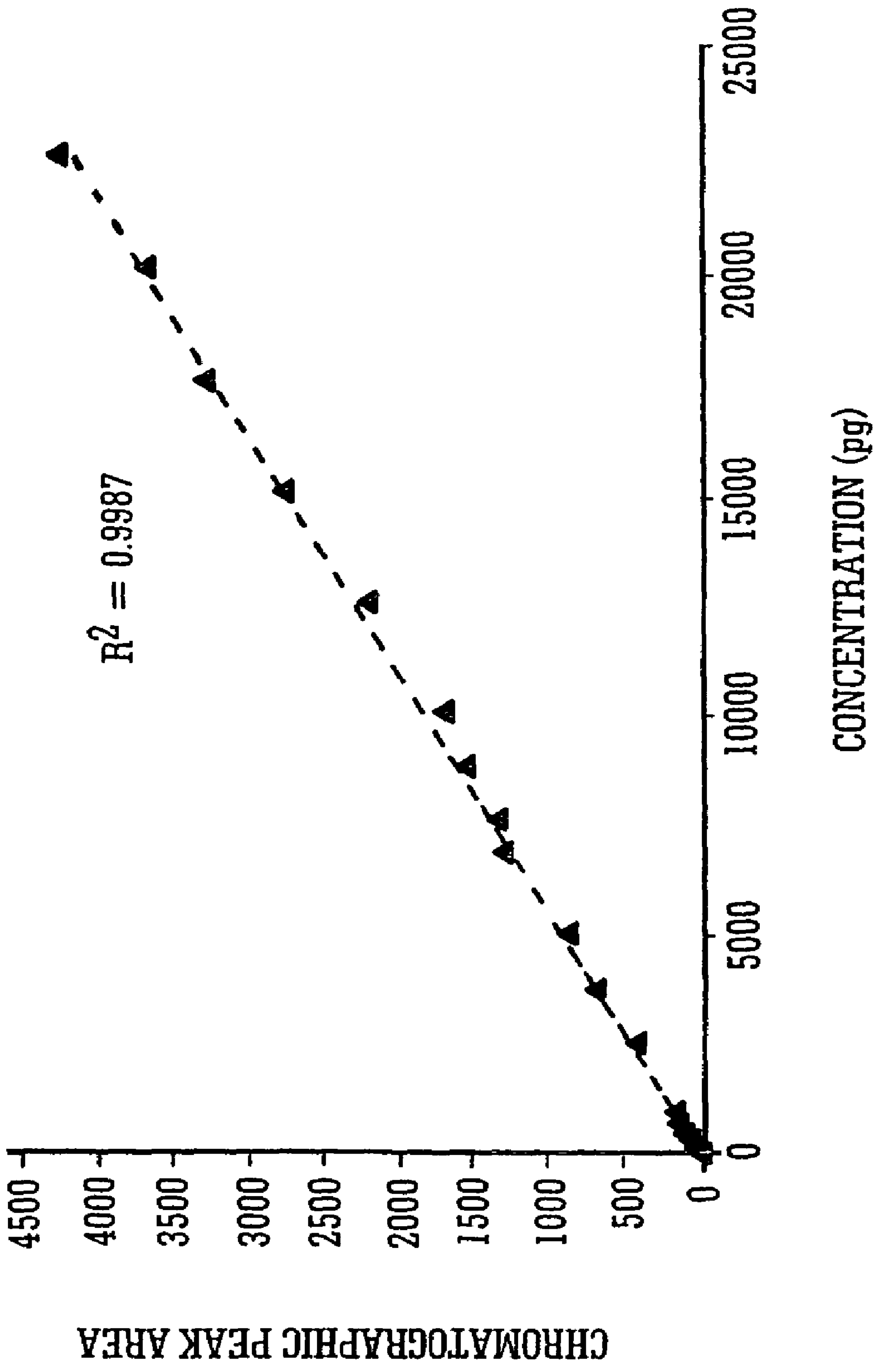
FIG. 13 illustrates how the preferred embodiment allows a linear response to be obtained over 4.65 orders of magnitude.

Finally, FIG. 13 shows a quantitation curve obtained from Octafluoronapthalene (OFN) at concentrations of 0.5 pg-22.5 ng using the preferred sensitivity switching approach. Injection was splitless and the oven was started at 60° C. which was held for two minutes and then ramped to 250° C. at a rate of 30° C./minute with ten mass spectra being obtained per second. A linear regression (least squares) fit with a 1/x weighting was applied and the corresponding coefficient of correlation was $R^2=0.9987$. This data shows that linearity was obtained over 4.65 orders of magnitude.

Although the present invention has been described with reference to preferred embodiments, it will be understood by those skilled in the art that various changes in form and detail may be made without departing from the scope of the invention as set forth in the accompanying claims.

The invention claimed is:

1. A method of mass spectrometry comprising:

providing an ion source, an ion optical device downstream of said ion source, and a mass analyser downstream of said ion optical device, said mass analyser comprising an ion detector;

repeatedly switching between a first mode and a second mode either said ion source, said ion optical device or the gain of said ion detector;

obtaining first mass spectral data during the first mode and second mass spectral data during said second mode;

interrogating said first mass spectral data;

determining whether at least some of said first mass spectral data may have been affected by saturation, distortion or missed counts; and using at least some of said second mass spectral data instead of at least some of said first mass spectral data if it is determined that at least some of said first mass spectral data has been affected by saturation, distortion or missed counts.

2. A method as claimed in claim 1, wherein said ion source is repeatedly switched between said first mode and said second mode by repeatedly varying the transmission of ions from the ion source.

3. A method as claimed in claim 1, wherein said ion source is repeatedly switched between said first mode and said second mode by repeatedly varying the ionization efficiency of said ion source.

4. A method as claimed in claim 1, wherein a beam of ions emitted from the ion source travels along an x-axis and said ion optical device comprises a z-lens arranged to deflect, focus, defocus or collimate said beam of ions in a z-direction substantially orthogonal to said x-axis and in a direction substantially normal to the plane of said mass analyser.

5. A method as claimed in claim 1, wherein a beam of ions emitted from the ion source travels along an x-axis and said ion optical device comprises an y-lens arranged to deflect, focus, defocus or collimate said beam of ions in a y-direction substantially orthogonal to said x-axis and in a direction substantially parallel to the plane of said mass analyser.

6. A method as claimed in claim 4, wherein said z-lens and/or said y-lens comprise an Einzel lens.

7. A method as claimed in claim 6, wherein said Einzel lens comprising a front, intermediate and rear electrode, with said front and rear electrodes being maintained, in use, at substantially the same DC voltage and said intermediate electrode being maintained, in use, at a different DC voltage to said front and rear electrodes.

8. A method as claimed in claim 7, wherein said front and rear electrodes are arranged to be maintained at between −30 to −50V DC for positive ions, and said intermediate electrode is switchable from a voltage ≦−80V DC to a voltage ≧+0V DC.

9. A method as claimed in claim 1, wherein a beam of ions emitted from the ion source travels along an x-axis and said ion optical device is arranged to deflect, focus, defocus or collimate said beam of ions in a y-direction and/or a z-direction, wherein said y-direction is substantially orthogonal to said x-axis and is in a direction substantially parallel to the plane of said mass analyser and wherein said z-direction is substantially orthogonal to said x-axis and is in a direction substantially normal to the plane of said mass analyser.

10. A method as claimed in claim 9, wherein said ion optical device is selected from the group consisting of: (i) a stigmatic focusing lens; and (ii) a DC quadrupole lens.

11. A method as claimed in claim 1, wherein in said second mode a beam of ions is diverged to have a profile which substantially exceeds an entrance aperture to or acceptance angle of said mass analyser.

12. A method as claimed in claim 1, wherein in said first mode a beam of ions is focused by said ion optical device so that they are subsequently onwardly transmitted and wherein in said second mode a beam of ions is defocused by said ion optical device so that only a fraction of the ions are subsequently onwardly transmitted.

13. A method as claimed in claim 1, wherein said ion optical device is an energy filtering device arranged to transmit only those ions having a kinetic energy greater than a predetermined amount.

14. A method as claimed in claim 1, wherein said ion detector comprises an Analogue to Digital Converter ("ADC") and the gain of said ion detector is repeatedly switched or varied between said first and said second mode.

15. A method as claimed in claim 1, wherein in said first mode said ion source or said ion optical device has an ion transmission efficiency selected from the group consisting of: (i) ≧50%; (ii) ≧55%; (iii) ≧60%; (iv) ≧ 65%; (v) ≧70%; (vi) ≧75%; (vii) ≧80%; (viii) ≧85%; (ix) ≧90%; (x) ≧95%; or (xi) ≧98%.

16. A method as claimed in claim 1, wherein in said second mode said ion source or said ion optical device has an ion transmission efficiency selected from the group consisting of: (i) ≦50%; (ii) ≦45%; (iii) ≦40%; (iv) ≦35%; (v) ≦30%; (vi) ≦25%; (vii) ≦20%; (viii) ≦15%; (ix) ≦10%; (x) ≦5%; or (xi) ≦2%.

17. A method as claimed in claim 1, wherein the difference in sensitivity or ion transmission efficiency between said first and second modes is at least ×5, ×10, ×20, ×30, ×40, ×50, ×60, ×70, ×80, ×90 or ×100.

18. A method as claimed in claim 1, wherein in said second mode the number of ions that pass through an entrance aperture to the mass analyser is arranged to be ≦20%, ≦15%, ≦10%, ≦5%, ≦4%, ≦3%, ≦2%, or ≦1% of the number of ions that pass through the entrance aperture in said first mode.

19. A method as claimed in claim 1, wherein substantially the same amount of time is spent in said first mode as in said second mode during acquisition of mass spectral data.

20. A method as claimed in claim 1, wherein the amount of time spent in said first mode is substantially different to the amount of time spent in said second mode during acquisition of mass spectral data.

21. A method as claimed in claim 1, wherein either said ion source, said ion optical device or the gain of said ion detector is switched from said first mode to said second mode at least one, two, three, four, five, six, seven, eight, nine or ten times per second.

22. A method as claimed in claim 1, wherein either said ion source, said ion optical device or the gain of said ion detector is repeatedly switched between three or more modes.

23. A method as claimed in claim 1, wherein said mass analyser is selected from the group consisting of: (i) a quadrupole mass analyser; (ii) a magnetic sector mass analyser; (iii) an ion trap mass analyser; (iv) a Time of Flight mass analyser; and (v) an orthogonal acceleration Time of Flight mass analyser.

24. A method as claimed in claim 1, wherein said ion detector is selected from the group consisting of: (i) an ion counting detector; (ii) a detector including a Time to Digital Converter ("TDC"); (iii) a detector capable of recording multiple ion arrivals; (iv) a detector including an Analogue to Digital Converter ("ADC"); (v) a detector comprising both a Time to Digital Converter ("TDC") and an Analogue to Digital Converter ("ADC"); (vi) a detector using one or more Analogue to Digital Converters ("ADC") operating at similar or dissimilar sensitivities; (vii) a detector using one or more Time to Digital Converters ("TDC") operating at similar or dissimilar sensitivities; (viii) a combination of one or more Time to Digital Converters ("TDC") and one or more Analogue to Digital Converters ("ADC"); (ix) a microchannel plate detector; (x) a detector including a discrete dynode electron multiplier; (xi) a detector including a photomultiplier; (xii) a detector including a hybrid microchannel plate electron multiplier; and (xiii) a detector including a hybrid microchannel plate photo multiplier.

25. A method as claimed in claim 1, wherein said ion source is a continuous ion source.

26. A method as claimed in claim 25, wherein said ion source is selected from the group consisting of: (i) an Electron Impact ("EI") ion source; (ii) a Chemical Ionisation ("CI") ion source; and (iii) a Field Ionisation ("FI") ion source.

27. A method as claimed in claim 26, wherein said ion source is coupled to a Gas Chromatography ("GC") source.

28. A method as claimed in claim 25, wherein said ion source is selected from the group comprising: (i) an Electrospray ("ESI") ion source; and (ii) an Atmospheric Pressure Chemical Ionisation ("APCI") source.

29. A method as claimed in claim 28, wherein said ion source is coupled to a Liquid Chromatography ("LC") source.

30. A method as claimed in claim 1, wherein said ion source is selected from the group consisting of: (i) an Atmospheric Pressure Photo Ionisation ("APPI") ion source; (ii) an Inductively Coupled Plasma ("ICP") ion source; (iii) a Fast Atom Bombardment ("FAB") ion source; (iv) a Matrix Assisted Laser Desorption Ionisation ("MALDI") ion source; (v) a Field Desorption ("FD") ion source; (vi) a Liquid Secondary Ions Mass Spectrometry ("LSIMS") ion source; and (vii) a Laser Desorption Ionisation ("LDI") ion source.

31. A method as claimed in claim 1, wherein said step of determining whether at least some of said first mass spectral data may have been affected by saturation, distortion or missed counts comprises:

providing an orthogonal acceleration Time of Flight mass analyser comprising an electrode for orthogonally accelerating ions into a drift region, said electrode being repeatedly energised; and determining if an individual mass peak in said first mass spectral data exceeds a first predetermined average number of ions per mass to charge ratio value per energisation of said electrode.

32. A method as claimed in claim 31, wherein said first predetermined average number of ions per mass to charge ratio value per energisation of said electrode is selected from the group consisting of: (i) 1; (ii) 0.01–0.1; (iii) 0.1–0.5; (iv) 0.5–1; (v) 1–1.5; (vi) 1.5–2; (vii) 2–5; and (viii) 5–10.

33. A method as claimed in claim 1, wherein said step of determining whether at least some of said first mass spectral data may have been affected by saturation, distortion or missed counts comprises:

providing an orthogonal acceleration Time of Flight mass analyser comprising an electrode for orthogonally accelerating ions into a drift region, said electrode being repeatedly energised; and determining if an individual mass peak in said second mass spectral data exceeds a second predetermined average number of ions per mass to charge ratio value per energisation of said electrode.

34. A method as claimed in claim 33, wherein said second predetermined average number of ions per mass to charge ratio value per energisation of said electrode is selected from the group consisting of: (i) 1/x; (ii) 0.01/x to 0.1/x; (iii) 0.1/x to 0.5/x; (iv) 0.5/x to 1/x; (v) 1/x to 1.5/x; (vi) 1.5/x to 2/x; (vii) 2/x to 5/x; and (viii) 5/x to 10/x, wherein x is the ratio of the difference in sensitivities between said first and second modes.

35. A method as claimed in claim 1, wherein said step of determining whether at least some of said first mass spectral data may have been affected by saturation, distortion or missed counts comprises:

comparing the ratio of the intensity of mass spectral peaks observed in said first mass spectral data with the intensity of corresponding mass spectral peaks observed in said second mass spectral data; and determining whether said ratio falls outside a predetermined range.

36. A method as claimed in claim 1, wherein said step of determining whether at least some of said first mass spectral data may have been affected by saturation, distortion or missed counts comprises:

monitoring the total ion current; and determining whether the total ion current exceeds a predetermined level.

37. A method as claimed in claim 1, further comprising:

determining that substantially all of said first mass spectral data may have been affected by saturation, distortion or missed counts; and using said second mass spectral data instead of said first mass spectral data.

38. A method as claimed in claim 37, wherein the step of determining that substantially all of said first mass spectral data may have been affected by saturation, distortion or missed counts comprises:

determining whether the total ion current recorded in said first mode exceeds a predetermined limit.

39. A method as claimed in claim 37, wherein the step of determining that substantially all of said first mass spectral data may have been affected by saturation, distortion or missed counts comprises:

determining whether the output current of an electron multiplication device exceeds a predetermined limit.

40. A method as claimed in claim 37, wherein the step of determining that substantially all of said first mass spectral data may have been affected by saturation, distortion or missed counts comprises:

monitoring a single mass spectral peak or summation of mass spectral peaks; and determining the intensity of said single mass spectral peak or summation of mass spectral peaks.

41. A method as claimed in claim 37, wherein the step of determining that substantially all of said first mass spectral data may have been affected by saturation, distortion or missed counts comprises:

monitoring the ion current with a detection device provided upstream of the ion detector.

42. A method of mass spectrometry, comprising:

obtaining mass spectral data at at least two different sensitivities or ion transmission efficiencies; and generating a composite mass spectrum by combining mass spectral data obtained at said at least two different sensitivities or ion transmission efficiencies.

43. A method of mass spectrometry, comprising:

producing a composite mass spectrum from mass spectral data obtained at at least two different sensitivities or ion transmission efficiencies.

44. A method of mass spectrometry, comprising:

providing a mass spectrum comprised of:

(i) first mass spectral peaks obtained in a relatively high sensitivity mode when it is determined that said first mass spectral peaks are unaffected by saturation, distortion or missed counts; and (ii) second mass spectral peaks obtained in a relatively low sensitivity mode when it is determined that corresponding first mass spectral peaks obtained in said relatively high sensitivity mode are affected by saturation, distortion or missed counts.

45. A method of mass spectrometry comprising:

providing an ion source, a Time of Flight mass analyser comprising an ion detector or detectors, and an ion optical device intermediate said ion source and said mass analyser;

repeatedly switching said ion optical device or said ion source so as to vary the intensity of ions received by said mass analyser;

obtaining a first mass spectrum when a relatively large number of ions are received by said mass analyser;

obtaining a second mass spectrum when a relatively small number of ions are received by said mass analyser; and interrogating said first mass spectrum and replacing mass spectral data in said first mass spectrum with mass spectral data in said second mass spectrum if it is determined that at least some of the mass spectral data in said first mass spectrum is distorted due to saturation or distortion of said ion detector or detectors.

46. A method of mass spectrometry, comprising:

providing a mass spectrum comprised of: (i) first mass spectral peaks obtained in a first mode when it is determined that the detector used to obtain said first mass spectral peaks is operating in a linear manner; and (ii) second mass spectral peaks obtained in a second mode when it is determined that the detector used to obtain corresponding first mass spectral peaks obtained in said first mode is operating in a non-linear manner.

47. A method of mass spectrometry comprising:

providing an ion source, a Time of Flight mass analyser comprising an ion counting detector or detectors, and an ion optical device intermediate said ion source and said mass analyser;

repeatedly switching said ion optical device or said ion source so as to vary the intensity of ions received by said mass analyser;

obtaining a first mass spectrum when a relatively large number of ions are received by said mass analyser;

obtaining a second mass spectrum when a relatively small number of ions are received by said mass analyser; and interrogating said second mass spectrum and determining whether mass spectral data in said first mass spectrum is reliable.

48. A method of mass spectrometry, comprising the steps of:

determining a first intensity of ions having a first mass to charge ratio when an ion beam having a relatively high transmission is transmitted to an ion detector;

determining a second intensity of ions having said same first mass to charge ratio when an ion beam having a relatively low transmission is transmitted to said ion detector;

determining whether said first intensity needs to be rejected due to said ion detector being saturated when said first intensity was determined; and substituting said first intensity with another intensity related to said second intensity if it is determined that said ion detector was saturated when said first intensity was determined.

49. A method as claimed in claim 48, wherein said another intensity substantially equals said second intensity multiplied by the ratio of said high transmission to said low transmission.

50. A method of mass spectrometry comprising the steps of:

transmitting an ion beam to an ion detector with a relatively low transmission and mass analysing said ion beam to obtain low transmission mass spectral data;

transmitting an ion beam to said ion detector with a relatively high transmission and mass analysing said ion beam to obtain high transmission mass spectral data; and providing a mass spectrum based upon said high transmission mass spectral data unless it is determined that said ion detector was saturated with ions when said high transmission mass spectral data was obtained in which case some or all of said high transmission mass spectral data is replaced with data related to said low transmission mass spectral data.

51. A method of mass spectrometry comprising:

repeatedly switching the gain of an ion detector;

obtaining first mass spectral data when said ion detector has a first relatively high gain;

obtaining second mass spectral data when said ion detector has a second relatively low gain;

determining whether at least some of said first mass spectral data is suffering from saturation, distortion or missed counts; and replacing at least some of said first mass spectral data with second mass spectral if it is determined that at least some of said first mass spectral data is suffering from saturation, distortion or missed counts.

52. A mass spectrometer comprising:

an ion source;

an ion optical device downstream of said ion source;

a mass analyser downstream of said ion optical device, said mass analyser comprising an ion detector; and a control system arranged to repeatedly switch between a first mode and a second mode either said ion source, said ion optical device or the gain of said ion detector;

wherein said mass analyser obtains, in use, first mass spectral data during said first mode and second mass spectral data during said second mode; and wherein said control system further:

(a) interrogates said first mass spectral data;

(b) determines whether at least some of said first mass spectral data may have been affected by saturation, distortion or missed counts; and (c) uses at least some of said second mass spectral data instead of at least some of said first mass spectral data if it is determined that at least some of said first mass spectral data has been affected by saturation, distortion or missed counts.

53. A mass spectrometer as claimed in claim 52, further comprising means for repeatedly varying the transmission of ions from the ion source.

54. A mass spectrometer as claimed in claim 52, further comprising means for repeatedly varying the ionization efficiency of the ion source.

55. A mass spectrometer as claimed in claim 52, wherein a beam of ions emitted from the ion source travels along an x-axis and said ion optical device comprises a z-lens arranged to deflect, focus, defocus or collimate said beam of ions in a z-direction substantially orthogonal to said x-axis and in a direction substantially normal to the plane of said mass analyser.

56. A mass spectrometer as claimed in claim 52, wherein a beam of ions emitted from the ion source travels along an x-axis and said ion optical device comprises an y-lens arranged to deflect, focus, defocus or collimate said beam of ions in a y-direction substantially orthogonal to said x-axis and in a direction substantially parallel to the plane of said mass analyser.

57. A mass spectrometer as claimed in claim 55, wherein said z-lens and/or said y-lens comprise an Einzel lens.

58. A mass spectrometer as claimed in claim 57, wherein said Einzel lens comprising a front, intermediate and rear electrode, with said front and rear electrodes being maintained, in use, at substantially the same DC voltage and said intermediate electrode being maintained, in use, at a different DC voltage to said front and rear electrodes.

59. A mass spectrometer as claimed in claim 58, wherein said front and rear electrodes are arranged to be maintained at between −30 to −50V DC for positive ions, and said intermediate electrode is switchable from a voltage ≦−80V DC to a voltage ≧+0V DC.

60. A mass spectrometer as claimed in claim 52, wherein a beam of ions emitted from the ion source travels along an x-axis and said ion optical device is arranged to deflect, focus, defocus or collimate said beam of ions in a y-direction and/or a z-direction, wherein said y-direction is substantially orthogonal to said x-axis and is in a direction substantially parallel to the plane of said mass analyser and wherein said z-direction is substantially orthogonal to said x-axis and is in a direction substantially normal to the plane of said mass analyser.

61. A mass spectrometer as claimed in claim 60, wherein said ion optical device is selected from the group consisting of: (i) a stigmatic focusing lens; and (ii) a DC quadrupole lens.

62. A mass spectrometer as claimed in claim 52, wherein in said second mode a beam of ions is diverged to have a profile which substantially exceeds an entrance aperture to or acceptance angle of said mass analyser.

63. A mass spectrometer as claimed in claim 52, wherein in said first mode a beam of ions is focused by said ion optical device so that they are subsequently onwardly transmitted and wherein in said second mode a beam of ions is defocused by said ion optical device so that only a fraction of the ions are subsequently onwardly transmitted.

64. A mass spectrometer as claimed in claim 52, wherein said ion optical device is an energy filtering device arranged to transmit only those ions having a kinetic energy greater than a predetermined amount.

65. A mass spectrometer as claimed in claim 52, wherein said ion detector comprises an Analogue to Digital Converter ("ADC") and the gain of said ion detector is repeatedly switched or varied between said first and said second mode.

66. A mass spectrometer as claimed in claim 52, wherein in said first mode said ion source or said ion optical device has an ion transmission efficiency selected from the group consisting of: (i) ≧50%; (ii) ≧55%; (iii) ≧60%; (iv) ≧65%; (v) ≧70%; (vi) ≧75%; (vii) ≧80%; (viii) ≧85%; (ix) ≧90%; (x) ≧95%; or (xi) ≧98%.

67. A mass spectrometer as claimed in claim 52, wherein in said second mode said ion source or said ion optical device has an ion transmission efficiency selected from the group consisting of: (i) ≦50%; (ii) ≦45%; (iii) ≦40%; (iv) ≦35%; (v) ≦30%; (vi) ≦25%; (vii) ≦20%; (viii) ≦15%; (ix) ≦10%; (x) ≦5%; or (xi) ≦2%.

68. A mass spectrometer as claimed in claim 52, wherein the difference in sensitivity between said first and second modes is at least ×5, ×10, ×20, ×30, ×40, ×50, ×60, ×70, ×80, ×90 or ×100.

69. A mass spectrometer as claimed in claim 52, wherein in said second mode the number of ions that pass through an entrance aperture to the mass analyser is arranged to be ≦20%, ≦15%, ≦10%, ≦5%, ≦4%, ≦3%, ≦2%, or ≦1% of the number of ions that pass through the entrance aperture in said first mode.

70. A mass spectrometer as claimed in claim 52, wherein substantially the same amount of time is spent in said first mode as in said second mode during acquisition of mass spectral data.

71. A mass spectrometer as claimed in claim 52, wherein the amount of time spent in said first mode is substantially different to the amount of time spent in said second mode during acquisition of mass spectral data.

72. A mass spectrometer as claimed in claim 52, wherein either said ion source, said ion optical device or the gain of said ion detector is switched from said first mode to said second mode at least one, two, three, four, five, six, seven, eight, nine or ten times per second.

73. A mass spectrometer as claimed in claim 52, wherein either said ion source, said ion optical device or the gain of said ion detector is repeatedly switched between three or more modes.

74. A mass spectrometer as claimed in claim 52, wherein said mass analyser is selected from the group consisting of: (i) a quadrupole mass analyser; (ii) a magnetic sector mass analyser; (iii) an ion trap mass analyser; (iv) a Time of Flight mass analyser; and (v) an orthogonal acceleration Time of Flight mass analyser.

75. A mass spectrometer as claimed in claim 52, wherein said ion detector is selected from the group consisting of: (i) an ion counting detector; (ii) a detector including a Time to Digital Converter ("TDC"); (iii) a detector capable of recording multiple ion arrivals; (iv) a detector including an Analogue to Digital Converter ("ADC"); (v) a detector comprising both a Time to Digital Converter ("TDC") and an Analogue to Digital Converter ("ADC"); (vi) a detector using one or more Analogue to Digital Converters ("ADC") operating at similar or dissimilar sensitivities; (vii) a detector using one or more Time to Digital Converters ("TDC") operating at similar or dissimilar sensitivities; (viii) a combination of one or more Time to Digital Converters ("TDC") and one or more Analogue to Digital Converters ("ADC"); (ix) a microchannel plate detector; (x) a detector including a discrete dynode electron multiplier; (xi) a detector including a photomultiplier; (xii) a detector including a hybrid microchannel plate electron multiplier; and (xiii) a detector including a hybrid microchannel plate photo multiplier.

76. A mass spectrometer as claimed in claim 52, wherein said ion source is a continuous ion source.

77. A mass spectrometer as claimed in claim 76, wherein said ion source is selected from the group consisting of:

(i) an Electron Impact ("EI") ion source; (ii) a Chemical Ionisation ("CI") ion source; and (iii) a Field Ionisation ("FI") ion source.

78. A mass spectrometer as claimed in claim 77, wherein said ion source is coupled to a Gas Chromatography ("GC") source.

79. A mass spectrometer as claimed in claim 78, wherein said ion source is selected from the group comprising:

(i) an Electrospray ("ESI") ion source; and (ii) an Atmospheric Pressure Chemical Ionisation ("APCI") source.

80. A mass spectrometer as claimed in claim 79, wherein said ion source is coupled to a Liquid Chromatography ("LC") source.

81. A mass spectrometer as claimed in claim 52, wherein said ion source is selected from the group consisting of: (i) an Atmospheric Pressure Photo Ionisation ("APPI") ion source; (ii) an Inductively Coupled Plasma ("ICP") ion source; (iii) a Fast Atom Bombardment ("FAB") ion source; (iv) a Matrix Assisted Laser Desorption Ionisation ("MALDI") ion source; (v) a Field Desorption ("FD") ion source; (vi) a Liquid Secondary Ions Mass Spectrometry ("LSIMS") ion source; and (vii) a Laser Desorption Ionisation ("LDI") ion source.

82. A mass spectrometer, comprising:

an ion source;

an ion optical device;

a Time of Flight mass analyser comprising an ion detector or detectors;

control means arranged to repeatedly switch said ion optical device or said ion source so as to vary the intensity of ions received by said mass analyser wherein a first mass spectrum when a relatively large number of ions are received by said mass analyser is obtained, in use, and a second mass spectrum when a relatively small number of ions are received by said mass analyser is obtained, in use; and processor means which interrogates said first mass spectrum and replaces mass spectral data in said first mass spectrum with mass spectral data from said second mass spectrum if it is determined that at least some of the mass spectral data in said first mass spectrum is distorted due to saturation or distortion of said ion detector or detectors.

83. A mass spectrometer, comprising:

an ion detector comprising an Analogue to Digital Converter;

control means arranged to repeatedly switch the gain of said Analogue to Digital Converter between a relatively high gain and a relatively low gain so that first mass spectral data is obtained when said Analogue to Digital Converter has said relatively high gain and second mass spectral data is obtained when said Analogue to Digital Converter has said relatively low gain; and processor means which interrogates said first mass spectral data and uses at least some second mass spectral data instead of at least some first mass spectral data if it is determined that at least some of said first mass spectral data is distorted, saturated, or suffering from missed counts.

* * * * *